(12) United States Patent
Panuski et al.

(10) Patent No.: US 11,860,458 B2
(45) Date of Patent: Jan. 2, 2024

(54) ALL-OPTICAL SPATIAL LIGHT MODULATOR

(71) Applicant: Massachusetts Institute of Technology, Cambridge, MA (US)

(72) Inventors: Christopher Louis Panuski, Somerville, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 205 days.

(21) Appl. No.: 17/216,272

(22) Filed: Mar. 29, 2021

(65) Prior Publication Data

US 2021/0240016 A1 Aug. 5, 2021

Related U.S. Application Data

(63) Continuation of application No. 16/872,731, filed on May 12, 2020, now Pat. No. 11,022,826.

(60) Provisional application No. 62/873,232, filed on Jul. 12, 2019.

(51) Int. Cl.
  *G02F 1/01* (2006.01)
  *G02F 1/025* (2006.01)

(52) U.S. Cl.
  CPC .......... *G02F 1/025* (2013.01); *G02F 2202/32* (2013.01); *G02F 2203/12* (2013.01); *G02F 2203/15* (2013.01)

(58) Field of Classification Search
  CPC ............. G02F 1/025; G02F 2001/0152; G02F 2203/12; G02F 2203/15; G02F 2202/32; G02F 1/0126

USPC .................................................. 359/11, 259
See application file for complete search history.

(56) References Cited

U.S. PATENT DOCUMENTS

| | | | |
|---|---|---|---|
| 5,337,183 | A | 8/1994 | Rosenblatt |
| 6,552,842 | B2 | 4/2003 | Simpson et al. |
| 8,829,638 | B2 | 9/2014 | Shambat et al. |
| 8,989,533 | B2 | 3/2015 | Rossi et al. |
| 9,759,935 | B2 | 9/2017 | Luo et al. |
| 10,088,670 | B1 | 10/2018 | Hester et al. |

(Continued)

OTHER PUBLICATIONS

"Individually-addressable flip-chip AlInGaN micropixelated light emitting diode arrays with high continuous and nanosecond output power" by Zhang et al, Optics Express, vol. 16, No. 13, pp. 9918-9926 (Year: 2008).*

(Continued)

*Primary Examiner* — Robert Tavlykaev
(74) *Attorney, Agent, or Firm* — Smith Baluch LLP

(57) ABSTRACT

A spatial light modulator (SLM) comprised of a 2D array of optically-controlled semiconductor nanocavities can have a fast modulation rate, small pixel pitch, low pixel tuning energy, and millions of pixels. Incoherent pump light from a control projector tunes each PhC cavity via the free-carrier dispersion effect, thereby modulating the coherent probe field emitted from the cavity array. The use of high-Q/V semiconductor cavities enables energy-efficient all-optical control and eliminates the need for individual tuning elements, which degrade the performance and limit the size of the optical surface. Using this technique, an SLM with $10^6$ pixels, micron-order pixel pitch, and GHz-order refresh rates could be realized with less than 1 W of pump power.

23 Claims, 22 Drawing Sheets

(56) References Cited

U.S. PATENT DOCUMENTS

| | | |
|---|---|---|
| 11,022,826 B2 | 6/2021 | Panuski et al. |
| 2004/0008397 A1 | 1/2004 | Noonan |
| 2007/0052660 A1 | 3/2007 | Montbach et al. |
| 2007/0292073 A1 | 12/2007 | Li |
| 2010/0321759 A1 | 12/2010 | Prucnal et al. |
| 2015/0069237 A1 | 3/2015 | Yagami et al. |
| 2015/0331297 A1 | 11/2015 | Han et al. |
| 2016/0116820 A1 | 4/2016 | Chui et al. |
| 2016/0377423 A1* | 12/2016 | Eilers .................. H04L 9/00 356/601 |
| 2017/0307958 A1* | 10/2017 | Abel ................. G02F 1/3525 |

OTHER PUBLICATIONS

"Individually addressable AlInGaN micro-LED arrays with CMOS control and subnanosecond output pulses" by McKendry et al, IEEE Photonic Technology Letters, vol. 21, No. 12, pp. 811-813 (Year: 2009).*

"Ultrafast all-optical modulation in GaAs photonic crystal cavities" by Husko et al., Applied Physics Letters 94, 021111 (Year: 2009).*

"Ultralow-energy and high-contrast all-optical switch involving Fano resonance based on coupled photonic crystal nanocavities" by Nozaki et al, Optics Express, vol. 21, No. 10, pp. 11877-11888 (Year: 2013).*

"Tunable metasurfaces via subwavelength phase shifters with uniform amplitude" by Colburn et al, Scientific Reports, vol. 7, paper 40174, pp. 1-9 (Year: 2017).*

"Low Threshold Organic Semiconductor Lasers" by Wang, PhD thesis, Springer, DOI 10.1007/978-3-319-01267-4 (Year: 2014).*

"Light-emitting diode pumped luminescent concentrators: a new opportunity for low-cost solid-state lasers" by Barbet et al, Optica, vol. 3, No. 5, pp. 465-468 (Year: 2016).*

Abe et al., "Living-cell imaging using a photonic crystal nanolaser array." Optics Express 23.13 (2015): 17056-17066.

Aldaya et al., "Nonlinear carrier dynamics in silicon nano-waveguides." Optica 4.10 (2017): 1219-1227.

Altug et al., "Experimental demonstration of the slow group velocity of light in two-dimensional coupled photonic crystal microcavity arrays." Applied Physics Letters 86.11 (2005): 111102. 4 pages.

Altug et al., "Photonic crystal nanocavity array laser." Optics express 13.22 (2005): 8819-8828.

Altug et al., "Polarization control and sensing with two-dimensional coupled photonic crystal microcavity arrays." Optics Letters 30.9 (2005): 982-984.

Altug et al., "Two-dimensional coupled photonic crystal resonator arrays." Applied Physics Letters 84.2 (2004): 161-163.

Altug et al., "Ultrafast photonic crystal nanocavity laser." Nature physics 2.7 (2006): 484-488.

Asano et al., "Photonic crystal nanocavity with a Q factor exceeding eleven million." Optics express 25.3 (2017): 1769-1777.

Ashida et al., "Ultrahigh-Q photonic crystal nanocavities fabricated by CMOS process technologies." Optics Express 25.15 (2017): 18165-18174.

Bose et al., "Carrier dynamics in GaAs photonic crystal cavities near the material band edge." Optics Express 23.10 (2015): 12732-12739.

Bruck et al., "Device-level characterization of the flow of light in integrated photonic circuits using ultrafast photomodulation spectroscopy." Nature Photonics 9.1 (2015): 54-60.

Calusine et al., "Silicon carbide photonic crystal cavities with integrated color centers." Applied Physics Letters 105.1 (2014): 011123. 12 pages.

Chalcraft et al., "Mode structure of coupled L3 photonic crystal cavities." Optics express 19.6 (2011): 5670-5675.

Chen et al., "Selective tuning of high-Q silicon photonic crystal nanocavities via laser-assisted local oxidation." Optics express 19.13 (2011): 12480-12489.

Choi et al., "Self-similar nanocavity design with ultrasmall mode volume for single-photon nonlinearities." Physical review letters 118.22 (2017): 223605. 6 pages.

Colman et al., "Ultrafast coherent dynamics of a photonic crystal all-optical switch." Physical review letters 117.23 (2016): 233901. 5 pages.

De Rossi et al., "Interplay of plasma-induced and fast thermal nonlinearities in a GaAs-based photonic crystal nanocavity." Physical Review A 79.4 (2009): 043818. 9 pages.

Dems et al., "Numerical methods for modeling photonic-crystal VCSELs." Optics express 18.15 (2010): 16042-16054.

Dodane et al., "Fully embedded photonic crystal cavity with Q=0.6 million fabricated within a full-process CMOS multiproject wafer." Optics express 26.16 (2018): 20868-20877.

Dong et al., "High-contrast and low-power all-optical switch using Fano resonance based on a silicon nanobeam cavity." Optics letters 43.24 (2018): 5977-5980.

Faraon et al., "Local temperature control of photonic crystal devices via micron-scale electrical heaters." Applied Physics Letters 95.4 (2009): 043102. 4 pages.

Galli et al., "Light scattering and Fano resonances in high-Q photonic crystal nanocavities." Applied Physics Letters 94.7 (2009): 071101. 4 pages.

Gan et al., "A high-resolution spectrometer based on a compact planar two dimensional photonic crystal cavity array." Applied Physics Letters 100.23 (2012): 231104. 5 pages.

Holzman et al., "Ultrafast carrier dynamics in InP photonic crystals." Nanotechnology 16.6 (2005): 949. 5 pages.

Hu et al., "Experimental realization of deep-subwavelength confinement in dielectric optical resonators." Science advances 4.8 (2018): eaat2355. 7 pages.

Hudson et al., "Optically-addressed spatial light modulators." Optics & Laser Technology 23.5 (1991): 297-302.

International Search Report and Written Opinion in International Patent Application No. PCT/US2020/032444 dated Aug. 12, 2020, 11 pages.

Intonti et al., "Mode tuning of photonic crystal nanocavities by photoinduced non-thermal oxidation." Applied Physics Letters 100.3 (2012): 033116. 5 pages.

Intonti et al., "Spectral tuning and near-field imaging of photonic crystal microcavities." Physical Review B 78.4 (2008): 041401. 4 pages.

Jacoboni et al., "A review of some charge transport properties of silicon." Solid-State Electronics 20.2 (1977): 77-89.

Kats et al., "Optical absorbers based on strong interference in ultra-thin films." Laser & Photonics Reviews 10.5 (2016): 735-749.

Kim et al., "Large-Scale Uniform Optical Focus Array Generation with a Phase Spatial Light Modulator." Bulletin of the American Physical Society 64 (2019). 5 pages.

Kim et al., "Vertical beaming of wavelength-scale photonic crystal resonators." Physical Review B 73.23 (2006): 235117. 13 pages.

Kuramochi et al., "Large-scale integration of wavelength-addressable all-optical memories on a photonic crystal chip." Nature Photonics 8.6 (2014): 474-481.

Kurosaka et al., "On-chip beam-steering photonic-crystal lasers." Nature Photonics 4.7 (2010): 447-450.

Larqué et al., "Optimizing H1 cavities for the generation of entangled photon pairs." New Journal of Physics 11.3 (2009): 033022. 16 pages.

Liapis et al., "On-chip spectroscopy with thermally tuned high-Q photonic crystal cavities." Applied Physics Letters 108.2 (2016): 021105. 5 pages.

McKendry et al., "Visible-light communications using a CMOS-controlled micro-light-emitting-diode array." Journal of lightwave technology 30.1 (2011): 61-67.

Mehta et al., "High-Q CMOS-integrated photonic crystal microcavity devices." Scientific reports 4 (2014): 4077. 25 pages.

Midolo et al., "Electromechanical wavelength tuning of double-membrane photonic crystal cavities." Applied Physics Letters 98.21 (2011): 211120. 4 pages.

Minkov et al., "Photonic crystal slab cavity simultaneously optimized for ultra-high Q/V and vertical radiation coupling." Applied Physics Letters 111.13 (2017): 131104. 5 pages.

(56) References Cited

OTHER PUBLICATIONS

Mondia et al., "Ultrafast tuning of two-dimensional planar photonic-crystal waveguides via free-carrier injection and the optical Kerr effect." JOSA B 22.11 (2005): 2480-2486.
Moura et al., "Centimeter-scale suspended photonic crystal mirrors." Optics Express 26.2 (2018): 1895-1909.
Narimatsu et al., "Enhancement of vertical emission in photonic crystal nanolasers." Applied Physics Letters 100.12 (2012): 121117. 4 pages.
Nedeljkovic et al., "Free-Carrier Electrorefraction and Electroabsorption Modulation Predictions for Silicon Over the 1-14-$muhbox {m} $ Infrared Wavelength Range." IEEE Photonics Journal 3.6 (2011): 1171-1180.
Notomi et al., "Large-scale arrays of ultrahigh-Q coupled nanocavities." Nature photonics 2.12 (2008): 741. 7 pages.
Nozaki et al., "25-channel all-optical gate switches realized by integrating silicon photonic crystal nanocavities." Optics Express 22.12 (2014): 14263-14274.
Nozaki et al., "Sub-femtojoule all-optical switching using a photonic-crystal nanocavity." Nature Photonics 4.7 (2010): 477-483.
Ooka et al., "CMOS compatible high-Q photonic crystal nanocavity fabricated with photolithography on silicon photonic platform." Scientific reports 5 (2015): 11312. 9 pages.
Panuski et al., "Single photon detection by cavity-assisted all-optical gain." Physical Review B 99.20 (2019): 205303. 6 pages.
Portalupi et al., "Planar photonic crystal cavities with far-field optimization for high coupling efficiency and quality factor." Optics express 18.15 (2010): 16064-16073.
Qiu et al., "Active dielectric antenna on chip for spatial light modulation." Scientific reports 2 (2012): 855. 7 pages.
Sekoguchi et al., "Photonic crystal nanocavity with a Q-factor of~ 9 million." Optics Express 22.1 (2014): 916-924.
Shambat et al., "Ultrafast direct modulation of a single-mode photonic crystal nanocavity light-emitting diode." Nature communications 2.1 (2011): 1-6.
Shcherbakov et al., "Ultrafast all-optical switching with magnetic resonances in nonlinear dielectric nanostructures." Nano letters 15.10 (2015): 6985-6990.
Shcherbakov et al., "Ultrafast all-optical tuning of direct-gap semiconductor metasurfaces." Nature communications 8.1 (2017): 1-6.
Sokolov et al., "Tuning out disorder-induced localization in nanophotonic cavity arrays." Optics Express 25.5 (2017): 4598-4606.
Soljačić et al., "Enhancement of nonlinear effects using photonic crystals." Nature materials 3.4 (2004): 211-219.
Soltani et al., "Free-carrier electrorefraction and electroabsorption in wurtzite GaN." Optics Express 23.19 (2015): 24984-24990.
Soref et al., "Electrooptical effects in silicon." IEEE journal of quantum electronics 23.1 (1987): 123-129.
Takagi et al., "High Q H1 photonic crystal nanocavities with efficient vertical emission." Optics express 20.27 (2012): 28292-28300.
Tanabe et al., "Carrier diffusion and recombination in photonic crystal nanocavity optical switches." Journal of Lightwave Technology 26.11 (2008): 1396-1403.
Tanabe et al., "Low power and fast electro-optic silicon modulator with lateral pin embedded photonic crystal nanocavity." Optics express 17.25 (2009): 22505-22513.
Tanaka et al., "Dynamic control of the Q factor in a photonic crystal nanocavity." Nature materials 6.11 (2007): 862-865.
Toishi et al., "High-brightness single photon source from a quantum dot in a directional-emission nanocavity." Optics Express 17.17 (2009): 14618-14626.
Turner-Foster et al., "Ultrashort free-carrier lifetime in low-loss silicon nanowaveguides." Optics express 18.4 (2010): 3582-3591.
Vignolini et al., "Nonlinear optical tuning of photonic crystal microcavities by near-field probe." Applied Physics Letters 93.2 (2008): 023124. 4 pages.
Xu et al., "Breaking the delay-bandwidth limit in a photonic structure." Nature Physics 3.6 (2007): 406-410.
Xu et al., "The influence of material absorption on the quality factor of photonic crystal cavities." Optics express 17.10 (2009): 8343-8348.
Yang et al., "Digital resonance tuning of high-Q/V m silicon photonic crystal nanocavities by atomic layer deposition." Applied Physics Letters 91.16 (2007): 161114. 4 pages.
Yang et al., "Observation of femtojoule optical bistability involving Fano resonances in high-Q/V m silicon photonic crystal nanocavities." Applied Physics Letters 91.5 (2007): 051113. 4 pages.
Yu et al., "Nonlinear switching dynamics in a photonic-crystal nanocavity." Applied Physics Letters 105.7 (2014): 071112. 6 pages.
Yu et al., "Switching characteristics of an InP photonic crystal nanocavity: Experiment and theory." Optics express 21.25 (2013): 31047-31061.
Yüce et al., "Adaptive control of necklace states in a photonic crystal waveguide." ACS photonics 5.10 (2018): 3984-3988.
Zhang et al., "Ultralow power nonlinear response in an Si photonic crystal nanocavity." IEEE Photonics Journal 5.4 (2013): 6601409-6601409.

\* cited by examiner

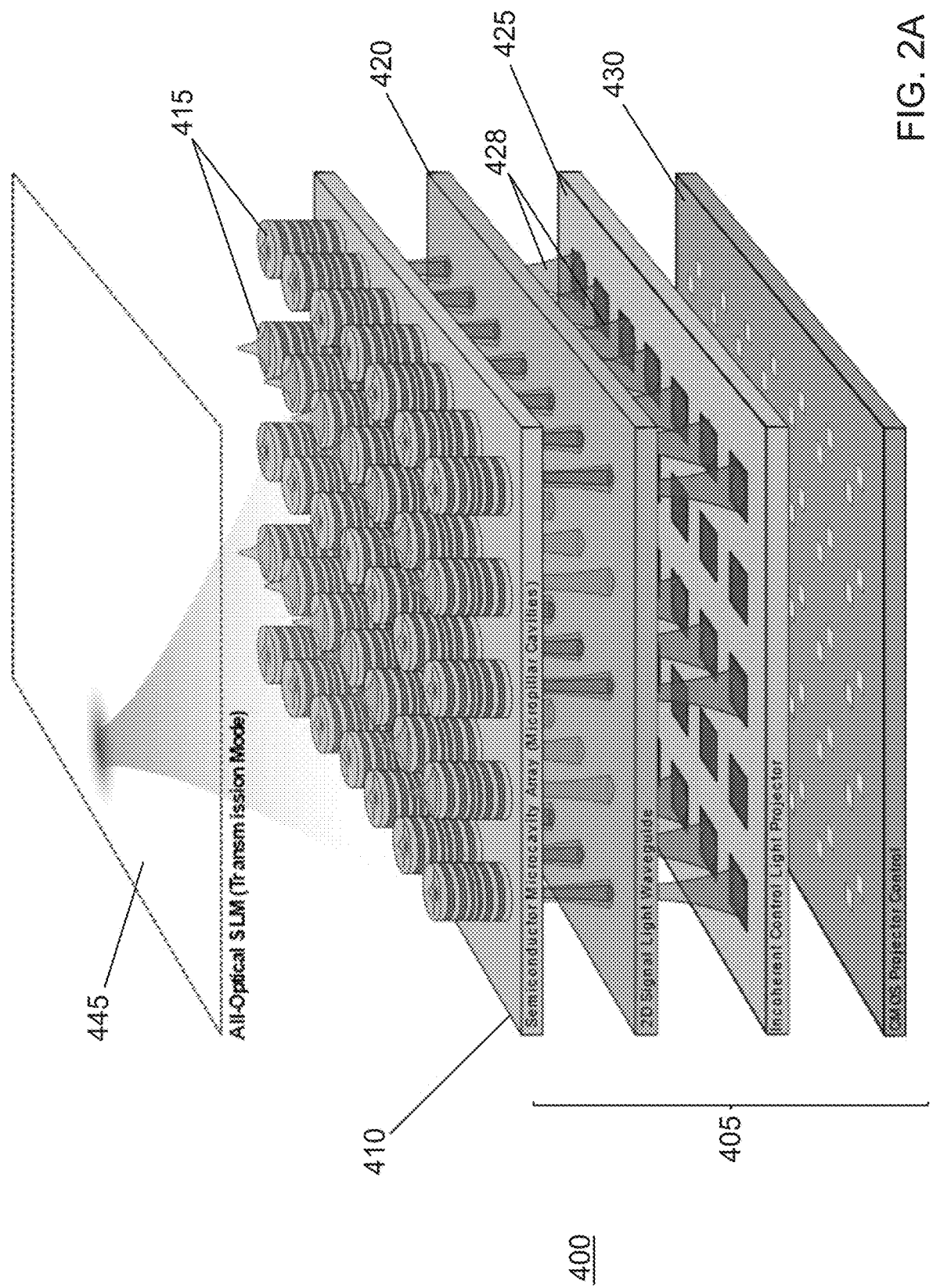

ALL-OPTICAL SPATIAL LIGHT MODULATOR

CROSS-REFERENCE TO RELATED APPLICATION(S)

This application is a continuation of and claims the priority benefit, under 35 U.S.C. 120, of U.S. application Ser. No. 16/872,731, filed May 12, 2020, which claims the priority benefit, under 35 U.S.C. 119(e), of U.S. Application No. 62/873,232, filed on Jul. 12, 2019, each of which is incorporated herein by reference in its entirety.

BACKGROUND

The generation and manipulation of structured light via spatial light modulators (SLMs) has become central to modern science and technology. Commercially available SLMs are ubiquitous, with common applications ranging from projectors to imagers and even manufacturing tools. In the laboratory, optical microscopy, metrology, imaging, and manipulation experiments leverage the dynamic reconfigurability of SLMs to control optical fields. For example, recent SLM-enabled demonstrations have included terahertz compressive imaging, deep-tissue imaging, trapping of single atoms in arbitrary lattices, and re-configurable integrated photonic switches.

However, despite their importance, modern commercial SLMs are limited by their operating principles. These devices can be broadly classified into two categories: liquid crystal on silicon (LCOS) SLMs and digital micromirror devices (DMDs). The frame rate of LCOS-based SLMs, which typically provide phase modulation by reorienting birefringent liquid crystals with an applied voltage, is limited to ~100 Hz by the LC natural response time. These LC response times are even longer at longer wavelengths, such as those used for infrared (IR) telecommunications, due to the need for thicker liquid crystal layers. DMDs offer on-off switching based on the electrically-controlled displacement of a MEMS mirror, and therefore enable modulation rates on the order of 10-100 kHz. However, their binary modulation significantly impairs the achievable diffraction efficiency (the ratio of energy in the first- and zeroth-order diffraction patterns) to roughly 30% of that of a typical LCOS SLM. MEMS deformable-mirrors (MEMS-DM) offer an alternative approach with excellent efficiency; however, the typical pixel pitch of a MEMS-DM is much greater than that of the controlled light. In fact, both LCOS and DMD techniques generally feature micron-order pixel pitches, which limits their use in applications such as IR beam steering where subwavelength ($\lambda/2$) values are desired.

Research devices have attempted to address these deficiencies. Due to its commercial feasibility and maturity, silicon photonics has attracted significant interest, yielding phase modulated arrays of 8×8, and more recently 32×32 vertical grating couplers. The demonstrated power efficiency and modulation rates, however, are both limited by the use of thermo-optic phase shifters, which have microsecond-order response times and require approximately 10 mW of power to generate a $\pi$ phase shift. While the incorporation of a free-carrier based phase shifter within a micro-ring or micro-disc resonator could simultaneously reduce the switching energy to roughly femtojoules and increase the modulation rate to roughly gigahertz, the additional element would further increase the pixel pitch, which is already limited by the large (several square micron) sizes of vertical grating couplers. Given these limitations, the performance and scale of photonic integrated circuit (PIC) SLMs has yet to exceed that of other commercial solutions.

SUMMARY

A spatial light modulator (SLM) includes a layer patterned with a two-dimensional array of semiconductor cavities, the two-dimensional array of semiconductor cavities scattering signal light at a resonant wavelength. The SLM also includes at least one incoherent light source, in optical communication with the two-dimensional array of semiconductor cavities, to tune the resonant wavelength of at least one semiconductor cavity in the two-dimensional array of semiconductor cavities via optical free carrier injection. In some cases, the at least one incoherent light source comprises a two-dimensional array of light-emitting diodes (LEDs). In some cases, the SLM further includes a control layer, operably coupled to the two-dimensional array of LEDs, to modulate LEDs in the two-dimensional array of LEDs at a rate of at least 10 MHz, at least 1 GHz, and/or the like. In some cases, the SLM also includes a signal waveguide layer, in optical communication with the two-dimensional array of LEDs and the two-dimensional array of semiconductor cavities, to image optical free carriers emitted by the two-dimensional array of LEDs onto the two-dimensional array of semiconductor cavities.

A SLM includes a resonant surface to reflect and/or transmit incident light at a resonant wavelength, and at least one light source, in optical communication with the resonant surface, to locally tune the resonant wavelength of the resonant surface via optical free carrier injection. In some cases, the at least one incoherent light source comprises a two-dimensional array of light-emitting diodes (LEDs). In some cases, the SLM further includes a control layer, operably coupled to the two-dimensional array of LEDs, to modulate LEDs in the two-dimensional array of LEDs at a rate of at least 1 GHz. In some cases, the SLM also includes a signal waveguide layer in optical communication with the two-dimensional array of LEDs and the two-dimensional array of semiconductor cavities, to image optical free carriers emitted by the two-dimensional array of LEDs onto the two-dimensional array of semiconductor cavities.

A SLM includes a photonic crystal (PhC) cavity array to reflect and/or transmit incident light at a resonant wavelength, the PhC cavity having a ratio of quality factor Q to mode volume V of at least about 100. The SLM also includes a two-dimensional array of light-emitting diodes (LEDs), in optical communication with the PhC cavity array, to locally tune the resonant wavelength of the PhC cavity array via optical free carrier injection. The SLM further includes a two-dimensional array of complementary metal-oxide semiconductor (CMOS) controllers, operably coupled to the two-dimensional array of LEDs, to modulate LEDs in the two-dimensional array of LEDs at a rate of at least 10 MHz.

In some cases, a distributed resonator—such as a slab photonic crystal guided mode resonator—can be used instead of the two-dimensional array. Similar to the two-dimensional array, the resonant frequency of the guided mode resonator may be locally tuned via free carrier injection from an incoherent light source. The guided mode resonator can also have about unity reflection efficiency, which provides high diffraction efficiency due to the distributed resonant mode, and avoids the need to couple into individual resonators.

The incoherent light source may be a two-dimensional array of light-emitting diodes (LEDs). In this case, the SLM may include a control layer operably coupled to the two-dimensional array of LEDs and a two-dimensional signal waveguide layer in optical communication with the two-dimensional array of LEDs and the two-dimensional array of semiconductor cavities. The control layer modulates LEDs in the two-dimensional array of LEDs at a rate of at least 10 MHz, at least 1 GHz, and/or the like. The waveguide layer images optical free carriers emitted by the two-dimensional array of LEDs onto the two-dimensional array of semiconductor cavities. These optical free carriers emitted by the two-dimensional array of LEDs can be at a wavelength of less than 500 nm and the signal light can be at a wavelength of more than 500 nm.

The SLM may also include a signal light waveguide layer, in optical communication with the semiconductor layer, to guide the signal light to the semiconductor cavity. A signal light source, in optical communication with the signal waveguide layer, can launch the signal light into the signal waveguide layer.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2A shows a transmission-mode all-optical SLM with micropillar cavities.

DETAILED DESCRIPTION

The spatial light modulators (SLMs) as described here address many of the deficiencies of conventional SLMs. Such an SLM may include a layer (e.g., a silicon layer) patterned with a two-dimensional array of semiconductor cavities and at least one incoherent light source, in optical communication with the two-dimensional array of semiconductor cavities. In operation, the two-dimensional array of semiconductor cavities scatters signal light at a resonant wavelength. And the incoherent light source tunes the resonant wavelength of at least one semiconductor cavity in the two-dimensional array of semiconductor cavities via optical free carrier injection.

Each semiconductor cavity in the two-dimensional array of semiconductor cavities can have a quality factor Q of at least 1000. The two-dimensional array of semiconductor cavities can be comprised of H1 photonic crystal cavities, L3 photonic crystal cavities, L4/3 photonic crystal cavities, or micropillar cavities. It may have a pitch equal to about half the resonant wavelength to about the resonant wavelength.

All-optical control can overcome the fundamental scaling limit associated with individual control elements, which can be described generally as follows. The number of pixels that can be placed within an array of area A scales directly with A, but the number of control elements that fit through the perimeter scales as $\sqrt{A}$. However, with all optical control, electronic controls don't need to be routed through a single layer to each pixel. When the electronic control employs CMOS control of the light source, 3D control electronics can be employed while keeping a single optical layer. Optical control can also allow for the emitters to be spread out more, as they can be imaged onto the semiconductor layer with variable magnification. These all-optical SLM designs and techniques are different than optically-addressed spatial light modulators, which can feature optically-written control masks but are still fundamentally limited by the slow response of the liquid crystal control medium.

A fast, efficient, low-pitch, and large scale SLM can directly impact a variety of existing fields and unveil entirely new avenues of research. Real-time, sub-diffraction-limited optical microscopy, ultra-dense optical interconnects, high-rate LiDAR, optical neural networks, topological quantum optics, and large-scale control of atomic ensembles for quantum science are a few envisioned applications that illustrate the diversity of foreseeable uses.

Example Spatial Light Modulators

Figure 1A:
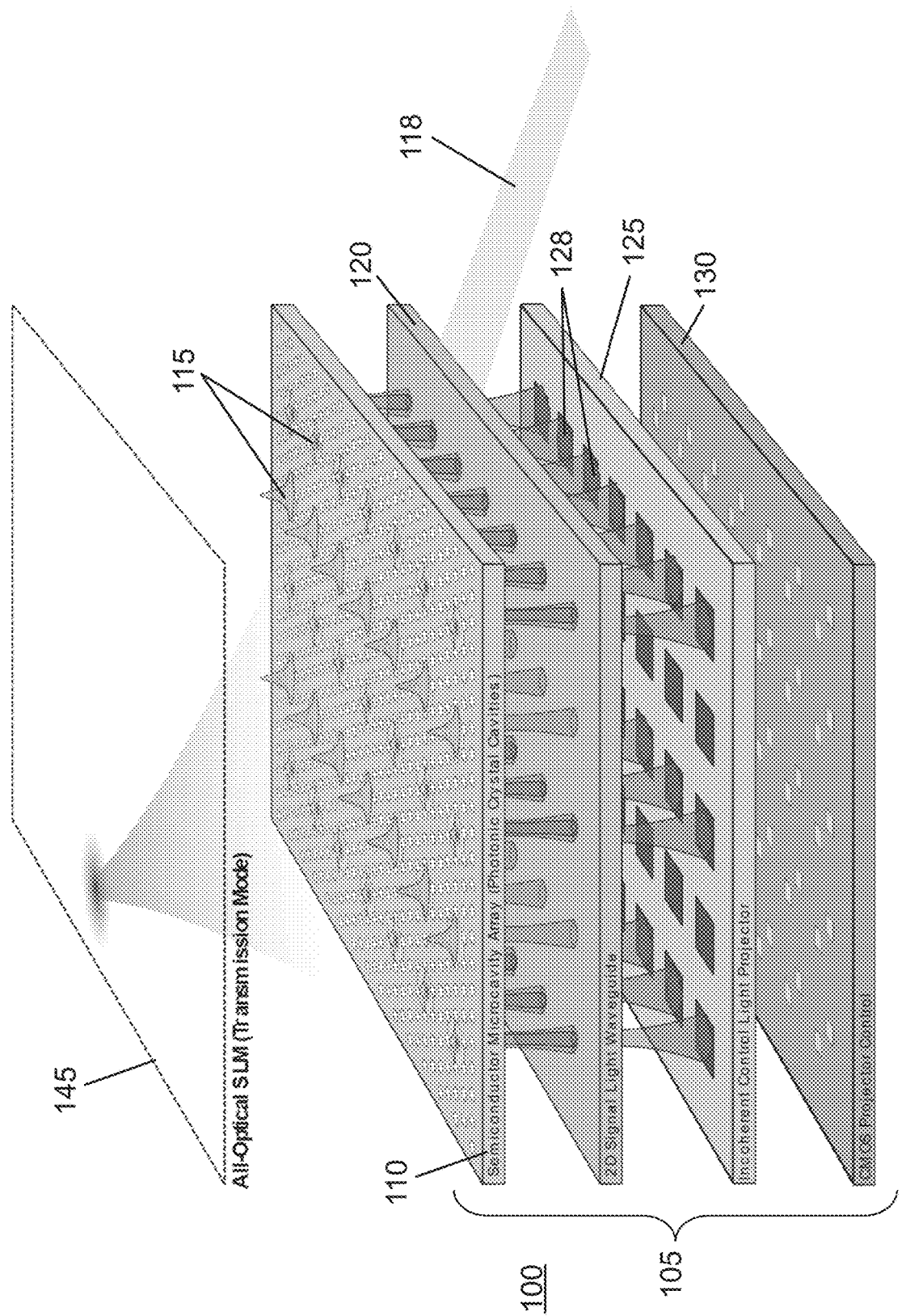
FIG. 1A shows a transmission-mode all-optical spatial light modulator (SLM).

FIG. 1A shows an example transmission-mode all-optical spatial light modulator (SLM) 105. The SLM 105 includes a cavity array 110 of semiconductor cavities 115, a signal light waveguide/waveguide array 120, an incoherent light projector array 125, and a CMOS control array 130.

The cavity array 110 can generally be structured as a 2D semiconductor cavity array of high-index cavities 115—with high experimental quality factor (Q) to mode volume ($V_{eff}$) ratios—creates a narrow-pitch lattice of localized modes when resonant signal light illuminates the surface of the cavity array 110. The quality factor (Q) can be about 1000, about 10,000, about 100,000, about 500,000, about 1,000,000, including all values and sub-ranges in between. The mode volume ($V_{eff}$) can be from about $0.1(\lambda/n)^3$ to about $5(\lambda/n)^3$, including all values and sub-ranges in between. The ratio $Q/V_{eff}$ can be from about 100 to about $10^7$, including all values and sub-ranges in between. FIG. 1A shows the array 110 as a photonic crystal cavity (PhC) array, but other vertically-coupled resonator types (e.g., micropillar, Fabry-Perot, and/or the like) can also be employed.

With an electro-refractive substrate material such as silicon, the amplitude and phase of each resonator's highly-confined mode can be modified via the plasma dispersion effect by injecting free carriers into the cavities 115. Since the strength of such free carrier nonlinear effects scales with $Q/V_{eff}$, fJ-order switching energies are possible for each mode. Free carriers can be injected optically at a wavelength below the modulation wavelength such that individual control elements on the optical surface of the cavity 110—which can both limit the spacing between and quality of optical resonators—are eliminated. The pitch concerns associated with traditional PIC components (thermo-optic phase shifters and grating couplers) can also be mitigated by introducing nanoscale integrated gratings into the PhC hole lattice, which simultaneously affords high-Q and efficient vertical coupling of each resonator mode out of the cavity 110. The viability of producing foundry-based PhC cavities has been established via photolithographic patterning. The 2D resonator array 110 can leverage such recent manufacturing advances to harness the enhanced light-matter interaction characteristic of PhC cavities, yielding an ultra-dense, energy-efficient modulator array.

The 2D signal light waveguide 120, also sometimes referred to simply as a waveguide, is optional, and can be employed, particularly in the fully integrated (transmission-mode) format of FIG. 1A, to efficiently distribute coherent light signal from a single signal laser to the PhC cavities 115, although any suitable distribution optics may be employed. For example, given a large enough array, an incident free space signal beam could be reflected from (depending on the coupling conditions) the PhC surface, as illustrated and described for FIG. 1B. When the array 120 is used, both the coherent signal beam as well as the incoherent control light can pass through the array 120.

In this modality, the SLM 105 can serve as a high-performance, multimode modulating retro-reflector. In some cases, the external signal light can be removed altogether by integrating active layers into the photonic crystal surface, thus forming an array of nanocavity light-emitting diodes (LEDs). The waveguide 120 can include, for example, a two-dimensional silicon waveguide array or an appropriately designed oxide slab. This slab or waveguide array can be any suitable design that equally distributes signal light power to each of the pixels.

The incoherent light projector array 125 can be employed to generate short-wavelength, incoherent, control/pump light to optically tune each resonator via the free carrier dispersion effect. Short wavelengths (e.g., less than about 500 nm) can be useful to achieve sufficient absorption in the thin PhC cavity array 110, which could, for example, be fabricated in the 220 nm silicon layer offered in standard SOI CMOS processes. In some cases (not shown), this control light could be simply imaged onto the surface of the array 110 using a high-resolution external display. For example, the high-resolution display light can be collected by a lens and imaged with variable magnification onto the cavity array 110. Alternatively, the high-resolution display light can be columnated by a collection lens and imaged through an infinity-corrected objective onto the cavity array 110. FIG. 1A illustrates a more integrated solution that includes the projector array 125 as, for example, a 2D array of incoherent emitters 128 such as short wavelength emitters. For example, the emitters 128 can be LEDs, vertical cavity surface emitting lasers (VCSELs), and/or the like. As one example, gallium nitride (GaN) LEDs, with ~450 nm emission wavelengths, may be employed. Individual GaN LEDs with GHz modulation bandwidths have been demonstrated, along with arrays with integrated micro-lenses and pitches of 10 μm or less.

The CMOS control array 130 is optional, and is employed for electronic control of individual emitters of the light projector array 125. The control array 130 can be configured to drive the emitters of the projector array 125 at a modulation rate of about 1 Hz, about 1 MHz, about 10 MHz, about 100 MHz, about 500 MHz, about 1 GHz, including all values and sub-ranges in between. Each pixel of the control array 130 can include, for example, a CMOS transistor to switch the connected emitter. The control array 130 pixels can also include local memory and/or digital-to-analog converters (DACs) to enable greyscale modulation of the incoherent emitters using locally stored patterns.

During use, in the illustrated transmission mode in FIG. 1A, a coherent signal light 118 is coupled into the array 110 of the high-quality factor (Q) (e.g., a Q of at least about 1000), low-mode volume ($V_{eff}$) semiconductor cavities 115 using the 2D signal waveguide 120, which allows the transmitted electromagnetic field to be shaped. The incoherent pump light projector 125—illustrated in FIG. 1A as a gallium nitride LED array emitting light at 450 nm—is imaged onto the cavity array 110 to control each resonant mode via the free carrier dispersion effect. Photoexcited carriers from the absorption of short-wavelength pump light enable fast (e.g., GHz range), low-energy (fJ-order) switching of signal modes due to the high $Q/V_{eff}$ ratio (e.g., a ratio of at least about 100) of the semiconductor cavities. Silicon photonic crystal cavities, which enable record high $Q/V_{eff}$ ratios using foundry fabrication processes, are shown in FIG. 1A as an example implementation of this cavity array 120. However, other semiconductor cavities—including micro-posts and vertical Fabry-Perot resonators—could also be switched by the control projector array 125. FIG. 1A also illustrates a plane 140 where, for example, a detector or other sensing device may be placed to receive the output light signal from the SLM 105.

The SLM 105 can efficiently generate incoherent modulated light from coherent modulated light based on several beneficial features. For example, the SLM 105 design permits fast modulation rates that can enable modern interconnects and novel applications. The micron-order pixel pitches can increase space-bandwidth product, increase fill factor, and enable 180° beam steering. The fJ-order pixel tuning energy enables low-power control of large cavity arrays, and mature fabrication techniques can allow for scaling to several million elements/cavities.

Figure 1B:
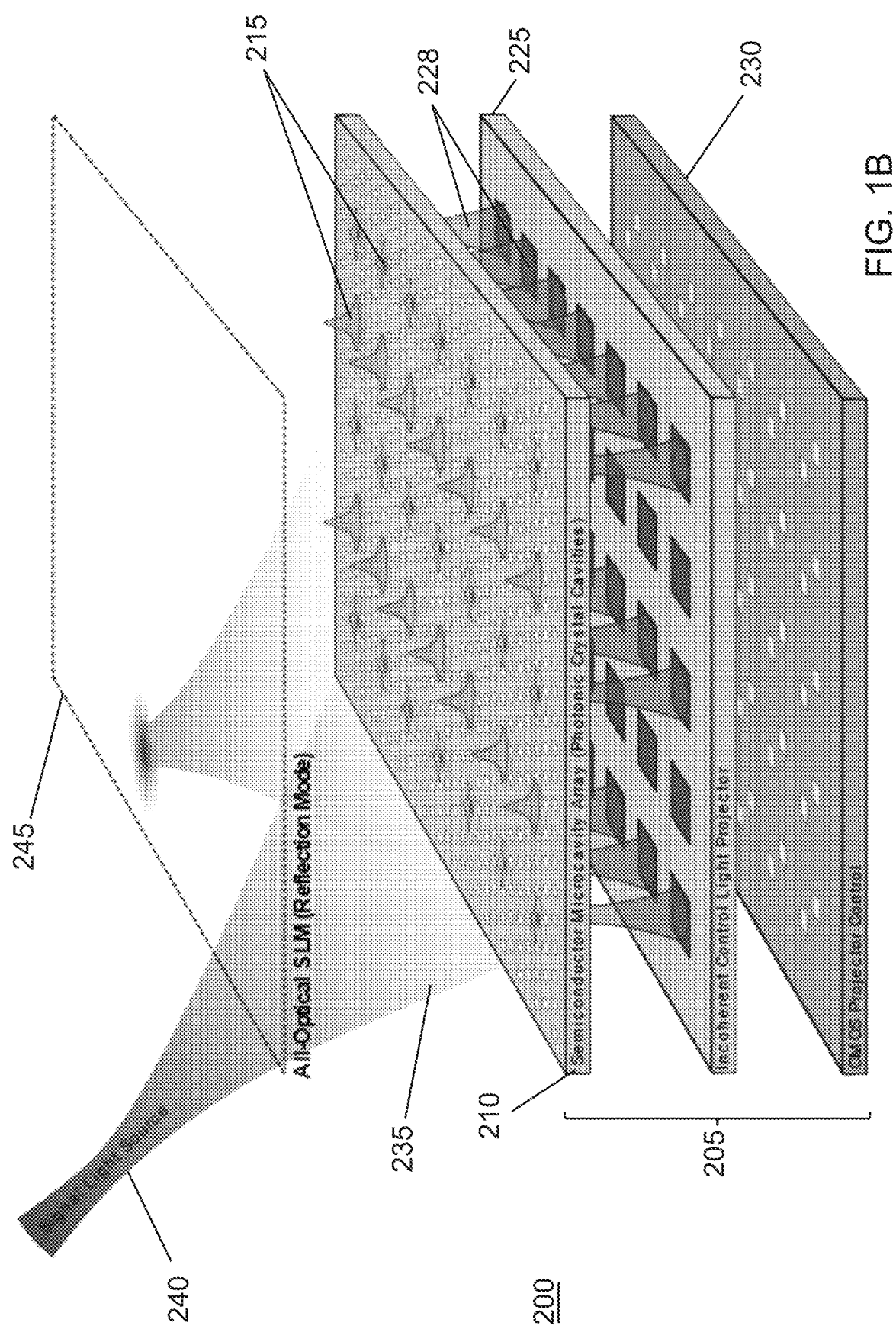
FIG. 1B shows a reflection-mode all-optical SLM.

FIG. 1B illustrates an alternative, reflection mode design of an SLM 205, where signal light can simply be reflected from the cavity array, and no signal light waveguide is required. This reflection-mode, all-optical SLM 205 is illustrated with a cavity array 210 (e.g., structurally and/or functionally similar to the array 110) of semiconductor cavities 215 (e.g., structurally and/or functionally similar to the cavities 115), an incoherent light projector array 225 (e.g., structurally and/or functionally similar to the light projector array 125), and an optional CMOS control array 230 (e.g., structurally and/or functionally similar to the control array 130). Here, the signal light waveguide 125 of FIG. 1A is omitted, and signal light 235 from a signal light source 240 instead reflects off the surface of the cavity array 210 and can be captured, such as by a sensing device at a plane 245. FIG. 1B also illustrates separation of the specular and cavity reflections based on the off-axis incidence of the signal light 235. In some cases normal excitation (signal beam shone vertically down onto cavity array 210) can be employed such as, for example, using a polarizing beam splitter instead used to separate the direct reflection and cavity reflection, since these two reflections have orthogonal polarizations if the incident polarization angle is 45 degrees off-axis with the dominant cavity polarization.

Figure 1C:
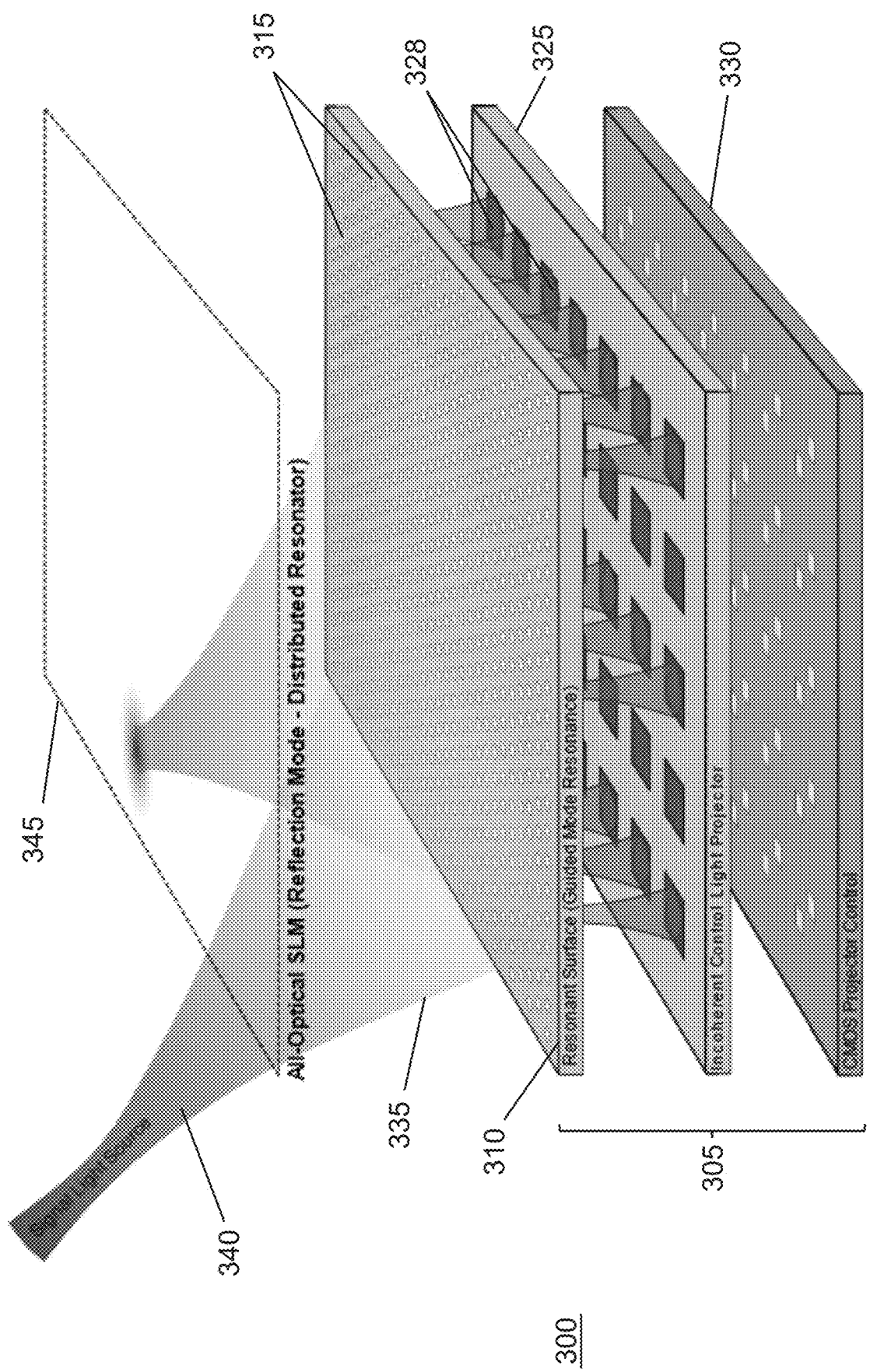
FIG. 1C shows a reflection-mode all-optical spatial light modulator (SLM) using a guided mode resonator to shape reflected light.

FIG. 1C shows another reflection mode SLM 305. This reflection-mode, all-optical spatial light modulator 305 includes a resonant surface 310, an incoherent light projector array 325 (e.g., structurally and/or functionally similar to the light projector array 125), and an optional CMOS control array 330 (e.g., structurally and/or functionally similar to the control array 130). Generally, instead of a 2D semiconductor cavity array, a resonant surface can be used to reflect incident light with about near unity reflection efficiency. Free carriers can be optically injected in arbitrary patterns to provide the local resonance shifts desired to shape the amplitude or phase of the reflected light. The resonant surface can be any suitable sub-wavelength layer having a 2D layout of oscillators formed or deposited on it.

Here, the 2D microcavity array 210 of FIG. 1B is replaced with a resonant surface 310. The resonant surface 310 can be structured as a wavelength-scale patterned semiconductor slab that supports a distributed resonant mode such, for example, guided mode resonance. The resonant surface can include, for example, a square or hexagonal lattice of holes in a semiconductor slab which is designed to support vertically-coupled guided mode resonances at the desired frequency.

The resonant surface 310 reflects signal light 335 from a light source 340 to generate an output signal that can be captured, such as by a sensing device at a plane 345. Generally, PhC cavities can provide high-Q diffraction-limited confinement of optical modes, but can require precise coupling and fabrication. Guided mode resonators (GMRs) on the other hand, such as the surface 310, while providing modest quality factors, can be formed with a defect-free PhC lattice, and be intrinsically vertically coupled. Coupled bilayer photonic crystal slabs can be used to improve the achievable GMR quality factor. The GMR can be locally tuned optically by injecting free carriers with arbitrary patterns. This enables the amplitude and phase of the reflected light to be tuned as desired at spatial resolution approaching λ/2. The confined GMR modes exhibit large overlap with the injected free carriers and produce Fano reflection profiles due to interference between the direct reflection of incident light and vertical resonator leakage. Combined, these characteristics allow for efficient modulation of the reflection amplitude and phase with low power optical free carrier injection. While illustrated here for a reflection mode SLM design, a resonant surface can also be employed in transmission mode SLM designs, such as that illustrated in FIG. 1A.

FIG. 2A shows a transmission-mode all-optical spatial light modulator 405 that includes a cavity array 410 (e.g., structurally and/or functionally similar to the array 110), a signal light waveguide 420 (e.g., structurally and/or functionally similar to the waveguide 120), an incoherent light projector array 425 (e.g., structurally and/or functionally similar to the light projector array 125), and an optional control array 430 (e.g., structurally and/or functionally similar to the control array 130). Here, the cavity array includes micropillar cavities 415 instead of the photonic crystal cavities 115 of FIG. 1A. The micropillar cavities 415 of FIG. 2A can also be used in a reflection-mode all-optical SLM, e.g., in the SLM 205, by eliminating the signal light waveguide 220 in FIG. 1B and replacing the photonic crystal cavity array with these micropillar cavities. FIG. 2A illustrates the micropillar cavities 415 and incoherent light projectors of the projector array 425 as being arranged on the same lattice, with one micropillar cavity per incoherent light projector (e.g., per LED).

Figure 2B:
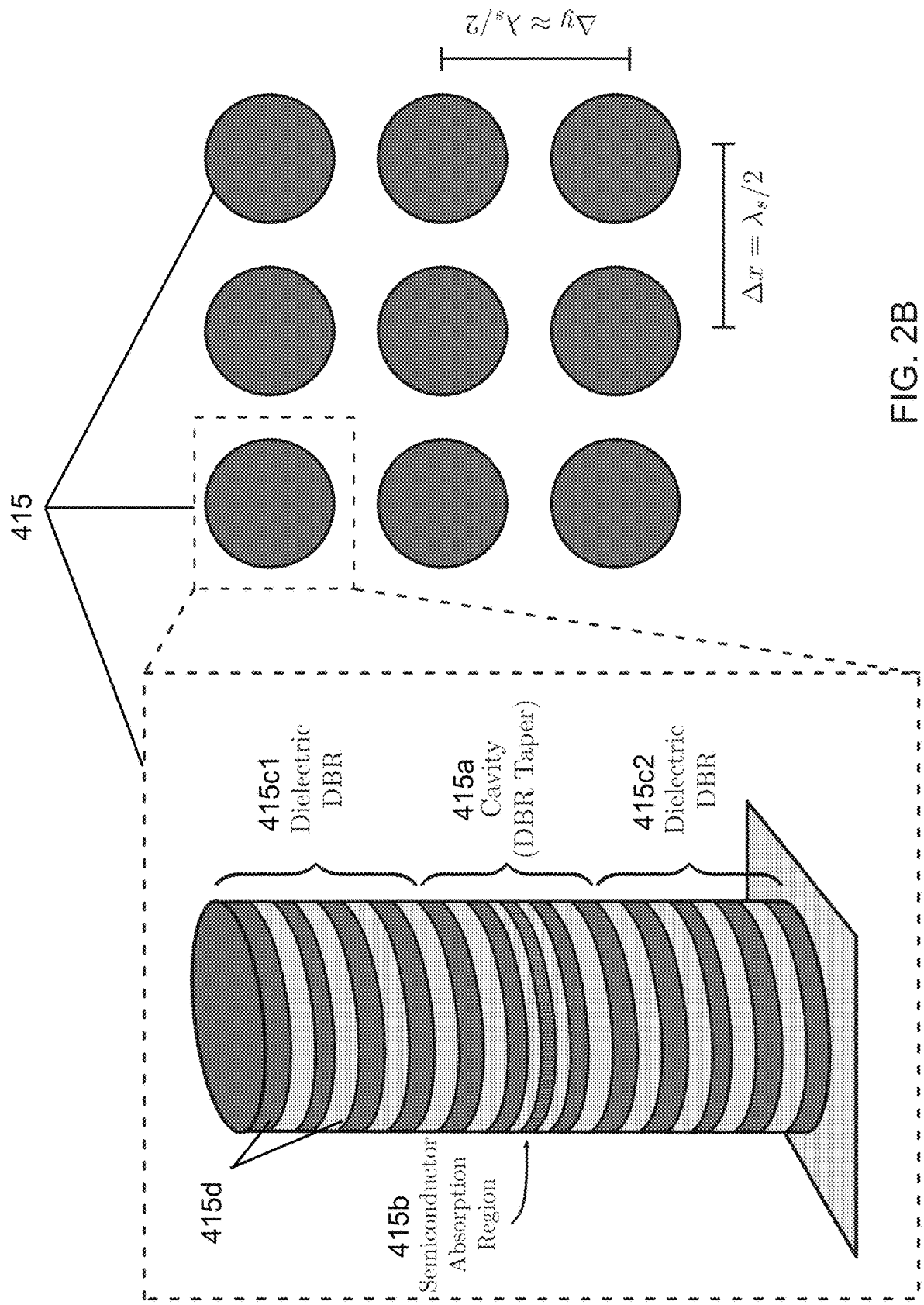
FIG. 2B shows one of the micropillar cavities of FIG. 2A in greater detail.

FIG. 2B shows a vertical micropillar cavity 415 suitable for use in the all-optical SLM 405 of FIG. 2A. The micropillar cavity 415 includes a central, low-bandgap cavity region 415a where the peak intensity region 415b of the optical mode is located and incoherent pump light is absorbed. Distributed Bragg reflectors (DBRs) 415c1, 415c2 comprising quarter-wavelength layers 415d of alternating high/low index dielectrics (e.g., TiO$_2$/SiO$_2$, InGaAsP/InP, or Si/SiO$_2$) are formed on top (the DBR 415c1) and bottom (the DBR 415c2) of the central cavity region 415b. The DBRs 415c1, 415c2 can confine light within the micropillar cavity 415 and set the desired coupling condition (under, over, or critically coupled) of signal light. These insulating DBRs 415c1, 415c2 also limit the diffusion of photogenerated charge carriers, increasing the overlap between free carriers and the optical mode. Towards the center of the cavity 415, the DBR layer thickness is adiabatically reduced to gently confine the mode, thus enhancing the achievable quality factor. The micropillar configuration of the cavity 415 can enhance vertical coupling at the cost of reduced quality factor. The cavity's quality factor can be from about 1000 to about 10,000. Half wavelength spacing (as also illustrated in FIG. 2B) between each micropillar cavity is possible for signal wavelengths from the visible to the infrared (IR) (e.g., 1300 nm to 1700 nm).

The optically tuned array of nanophotonic resonators, shown in FIGS. 1A and 1B as photonic crystal cavities and FIG. 2A as micropillar cavities, and tunable resonant surface (FIG. 1C) simultaneously achieve the desirable SLM performance metrics using the following components:

Generally referring to FIGS. 1A-1C, 2A-2B, the combination of these components—the cavity array (whether the optically tuned PhC arrays of FIGS. 1A and 1B, the tunable resonant surface of FIG. 1C, or the micropillar cavities FIGS. 2A, 2B), the light projector array, the signal light waveguide (in some cases), and the optional projector control array—can enable fast, energy-efficient, all-optical conversion of incoherent light into a dense array of coherent, modulated signal modes. The SLM designs and signal generation approaches described can leverage the fabrication maturity of silicon photonics but circumvent the traditional limitations of PIC components by incorporating optically-controlled, vertically-coupled photonic crystal cavities.

Example Analysis of Performance of an all-Optical SLM

The device performance of any of the SLMs described here can be approximated generally as follows. Assume that the absorbed pump light (e.g., from a light projector array) excites $N_{abs}$ free carrier pairs within a cavity's mode volume $V_{eff}$. According to perturbation theory, the free carrier dispersion effect then (nearly instantaneously) shifts the cavity resonance frequency $\omega_0$ by (see below for derivation)

$$\frac{\Delta \omega_0}{\Gamma_l} = -\gamma \frac{Q_l}{V_{eff}} N_{abs} \qquad (1)$$

where $Q_l = \omega_0 \Gamma_l$ is the loaded quality-factor of the resonator (given a loaded decay rate $\Gamma_l$) and $\gamma$ is a material dependent "scattering volume" that serves as the constant of proportionality between carrier density and the fractional index change |δn/n|. In silicon, $\gamma$ can be approximated in two ways: using the high-frequency limit of the Drude model or by linearizing the empirical formula $$\Delta n_{Si} = p(\lambda)[n_e \cdot cm^3]^{q(\lambda)} - r(\lambda)[n_h \cdot cm^3]^{s(\lambda)}, \qquad (2)$$

where $n_e = N_{abs}/V_{eff}(n_h)$ is the free electron (hole) density, and p, q, r, and s, are wavelength dependent coefficients. Eqn. (2) follows from absorption measurements in silicon for wavelengths between 1.3 and 14 μm. For a signal wavelength $\lambda_s$ of 1.55 μm, these two methods yield $\gamma \approx 3 \times 10^{-8}$ and $\gamma \approx 7 \times 10^{-9}$, respectively. The latter value is employed in subsequent calculations to yield a conservative approximation. The maximum allowable $Q_l$ for each SLM pixel is dictated by the desired modulation frequency. For modulation frequencies on the order of 10 GHz, $Q_l$ is limited to ~$10^4$. Finally, a diffraction limited mode volume $V_{eff}$ on the order of $0.1(\lambda_s/n_{Si})^3$ is chosen. Given that PhC cavities with ultrahigh-Q values on the order of a million are routinely fabricated (even in foundry-based CMOS processes) and sub-diffraction limited mode volumes of ~$10^{-3}$ $(\lambda_s/n_{Si})^3$ have been demonstrated, the selected parameters represent a readily fabricable PhC cavity. Combining the selected metrics, it is found that $$N_{abs} \approx 1.4 \times 10^3 \qquad (3)$$

free carrier pairs shift the frequency of the resonant cavity one linewidth ($\Delta\omega_0/\Gamma_l = 1$). In terms of pump energy, a one million pixel array ($d_{array} = 10^6$) operated at a 1 GHz modulation frequency ($f_{mod}$) would then use $$P_{pump}^{abs} = \hbar \omega_{pump} N_{abs} f_{mod} d_{array} \approx 0.6 \text{ W} \qquad (4)$$

of absorbed light assuming a 450 nm pump wavelength $\lambda_{pump}$. If one accounts for imperfect absorption of the pump light in a 220 nm-thick silicon membrane (see Table 1 for parameter details) the total input pump power is $$P_{pump}^{total} \approx 0.9 \text{ W}. \qquad (5)$$

This is an upper bound on the pump power incident on the PhC cavity array, as it is assumed that every pixel is modulated on-off at 1 GHz. In practice, not all pixels would be tuned in every modulation period. With these metrics in mind, targeted performance parameters are an array size of at least 1 megapixel (MP), a pixel pitch of 1.55 µm, a refresh rate of $10^9$ Hz, and a control power of less than 1 W.

Example 1

High-Q, Vertically-Coupled PhC Cavities

An all-optical SLM uses PhC cavities with two conflicting characteristics: high-Q and efficient vertical coupling. For example, a relatively higher Q cavity traps light for a longer time than one with a lower Q. However, good vertical coupling can mean that light can get in and out easily. An integrated grating as described here can optimize Q while simultaneously shaping the far field profile such that most of the light loss is collectable. High quality-factor PhC cavities are typically designed with "gentle confinement" to reduce out-of-plane leakage, resulting in a weak free-space coupling. However, several techniques have been proposed and demonstrated to overcome this limitation. Cavity-specific designs have shown that near-field shaping can produce Gaussian-like far-field radiation patterns which yield collection efficiencies greater than 80%. Alternatively, "band folding" with an integrated grating serves as a general, fabrication-tolerant approach to improving the collection efficiency of various PhC cavities. In this scheme, a periodic lattice perturbation—typically an increase in hole radius—at twice the lattice period a "folds" Fourier components located near the edge of the Brillouin zone ($k_\parallel = \pi/a$) down to the Γ ($k_\parallel = 0$) point, thereby enhancing vertical emission. Experimental implementations and theoretical analyses for L3, L5, and L7 cavities have demonstrated the possibility of achieving $Q \sim 10^5$ with 50% vertical coupling efficiency.

Figure 3A:
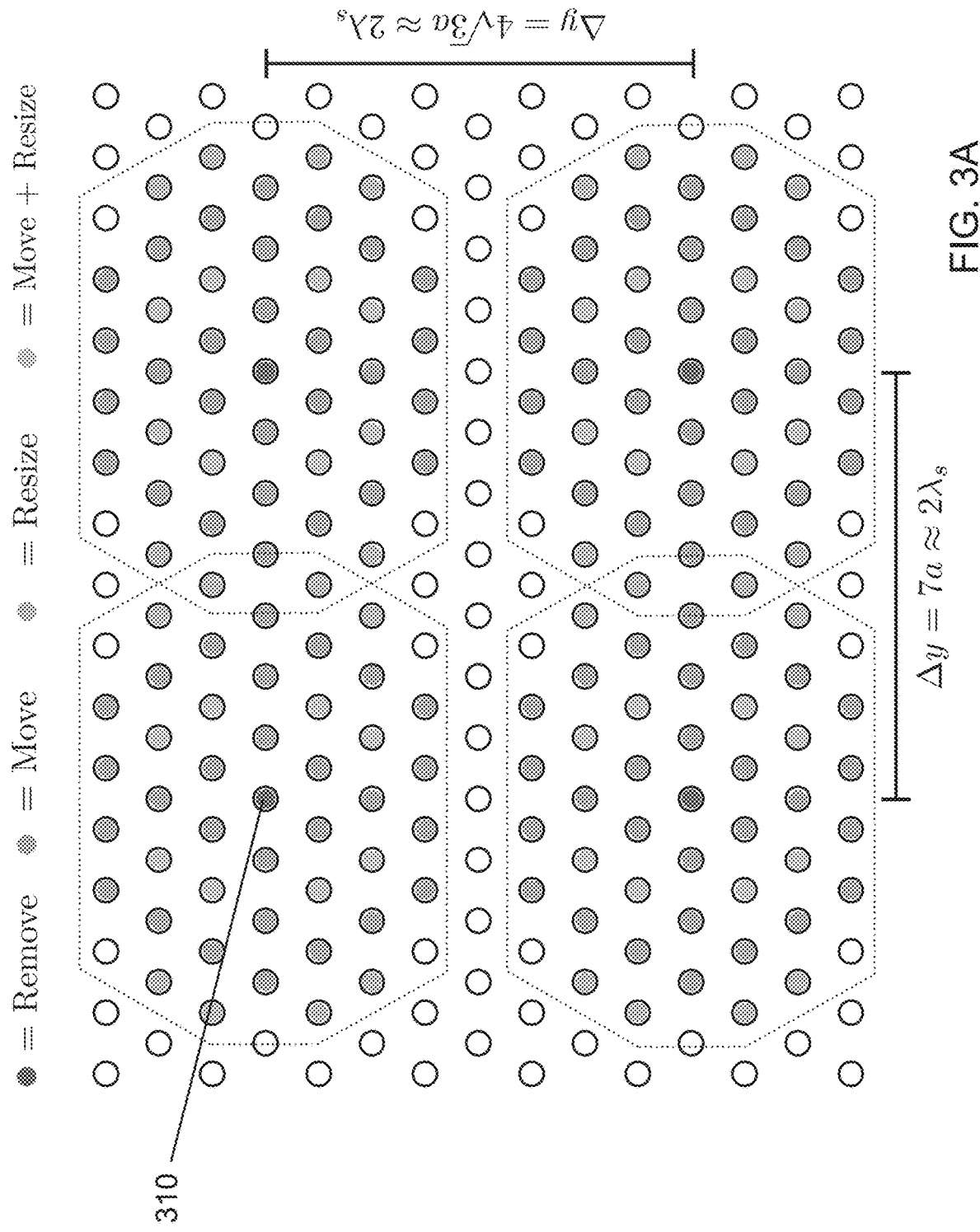
FIG. 3A shows an H1 PhC cavity array for an all-optical SLM.
Figure 3B:
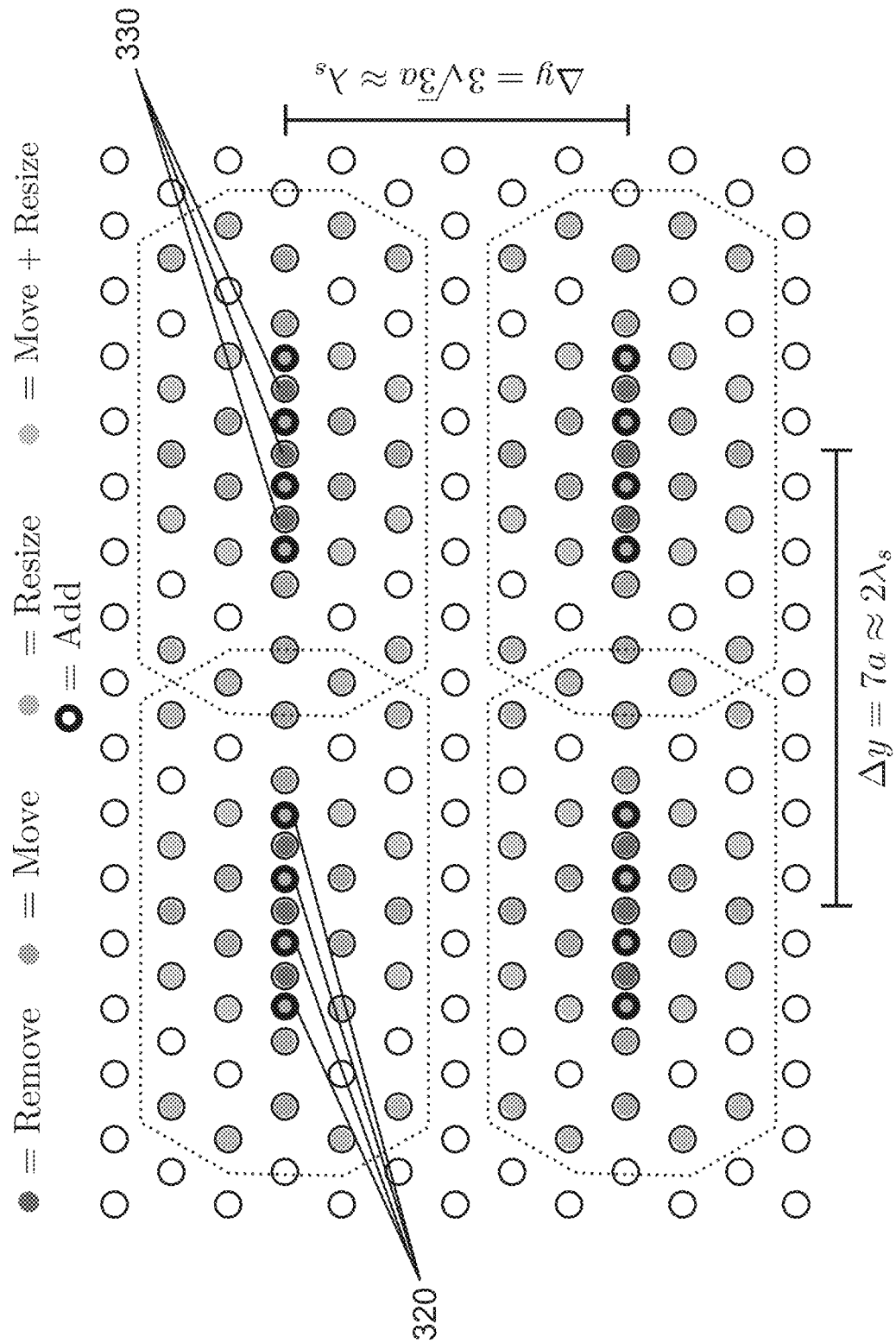
FIG. 3B shows an L4/3 PhC cavity array for an all-optical SLM.
Figure 3C:
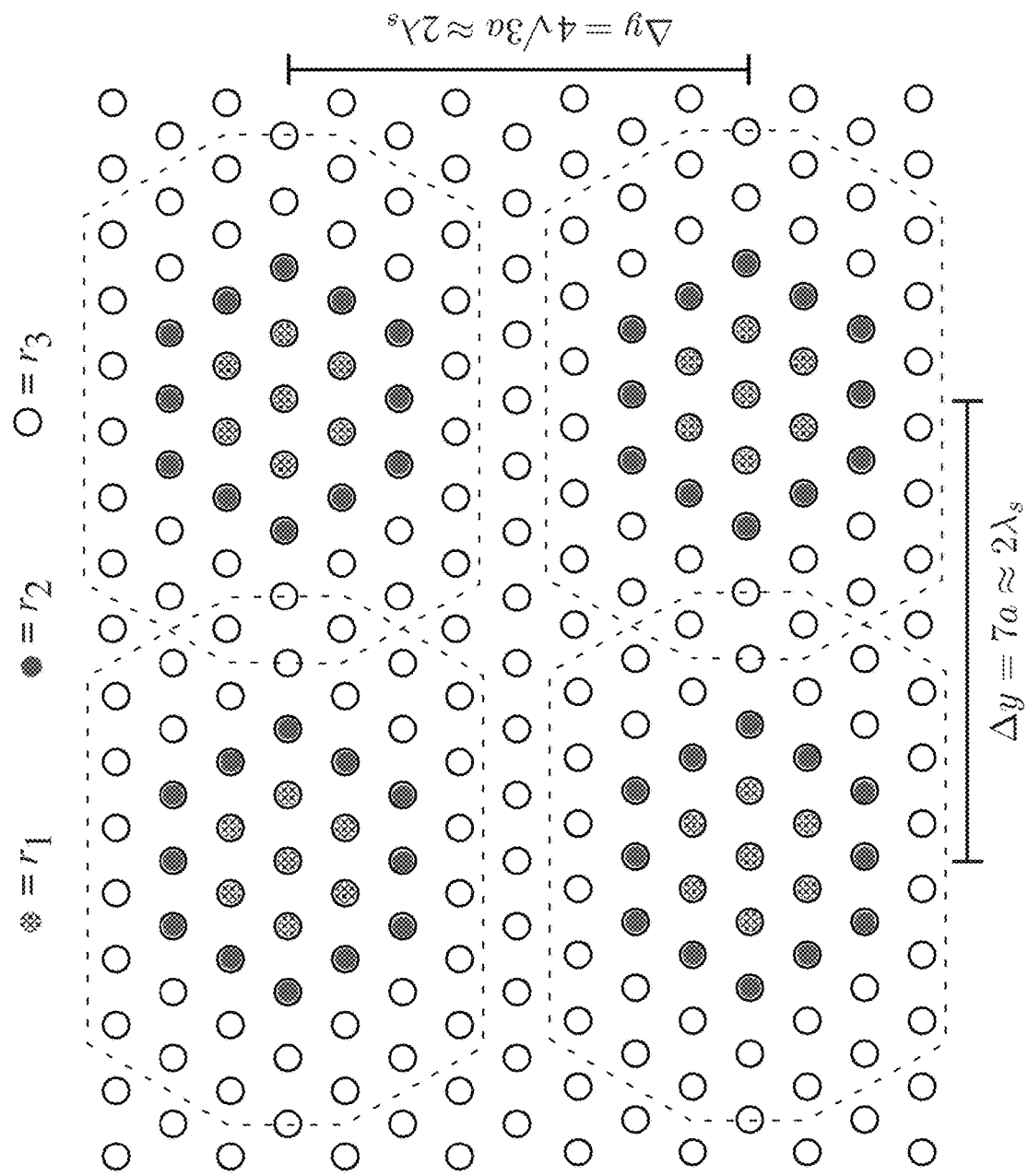
FIG. 3C shows a heterostructure cavity with a resonant mode at the gamma point that is vertically confined by symmetry protection.

FIGS. 3A-3C show cavity arrays with integrated gratings, where shading differentiates several modifications to the hole lattice. FIG. 3A shows the first array, which is composed of H1 cavities, each formed by removing a single hole 310, optimized by shifting three hexagonal layers of holes, and vertically-coupled with the addition of an integrated grating.

FIG. 3B shows how the cavity array can be formed with the "L4/3" cavity, where four holes 320 (bold circles in FIG. 3B) are added in place of the three holes 330 removed for a standard L3 cavity. This design is more amenable to photolithographic fabrication than an L3 cavity (optical proximity effects are minimized by reducing location variation in hole density), and affords low volume, high-Q, resonant modes. The resonant wavelength can also be readily tuned by varying the radius of the four internal holes 320.

The cavity designs illustrated in FIGS. 3A and 3B have cavity pitches between one and two wavelengths for a 1.5 µm signal wavelength, a control wavelength of less than about 500 nm, and a ~400 nm lattice constant. While this spacing can reduce or minimize coupling between cavities, other designs could attain subwavelength pitches with the use of a cavity-specific vertical coupling technique. For example, micro-post cavities with integrated dielectric reflectors would enable subwavelength pitches.

FIG. 3C shows a heterostructure cavity with a resonant mode at the gamma point (vertical wavevector) that is vertically confined by symmetry protection (this is a so called "bounded in the continuum state"). Lateral confinement is provided by tapering the radii of the holes ($r_1$, $r_2$, and $r_3$. in FIG. 3C) in a hexagonal pattern. Similar to the micropillar design in FIG. 2A, this cavity enhances vertical coupling at the expense of reduced quality factor (e.g., a quality factor on the order of 10,000). Since vertical coupling can be limited by symmetry (the optical mode and vertically propagating plane waves have opposite symmetry), the index contrast between the slab core and cladding can be reduced, allowing more material combinations to be used (one example is silicon nitride in a silicon dioxide cladding, which is often offered in foundry processes).

All-Optical Tuning

Each PhC cavity in the all-optical SLM is tuned via optical carrier injection. Here, the physical effects of optical carrier injection-based tuning of a photonic crystal cavity array are further explored, and a model to compare the effects of competing free carrier and thermal nonlinearities is described. With the results of this model, the architecture's limitations and solutions to these limitations are discussed, and also described several enhancements and modifications of the structure that enhance performance.

Free Carrier Dispersion

Free carrier dispersion yields a complex permittivity shift Δε that, according to first order perturbation theory, induces a fractional cavity resonance shift $$\frac{\Delta\omega_0}{\omega_0} = -\frac{1}{2}\frac{\int_{-\infty}^{\infty} d^3\vec{r}\,\Delta\epsilon(\vec{r})|\vec{E}(\vec{r})|^2}{\int_{-\infty}^{\infty} d^3\vec{r}\,\epsilon(\vec{r})|\vec{E}(\vec{r})|^2}. \tag{6}$$

For a uniform, perturbative index change throughout the volume containing free carriers ($V_{FC}$)—assumed to be greater than or equal to the cavity mode volume $V_{eff} = \int d^3\vec{r}\,\epsilon(\vec{r})|\vec{E}(\vec{r})|^2/\max\{\epsilon|E|^2\}$—Eqn. 6 simplifies to $$\frac{\Delta\omega_0}{\omega_0} \approx -\frac{\Delta n}{n}\frac{\int_{V_{FC}} d^3\vec{r}\,\epsilon(\vec{r})|\vec{E}(\vec{r})|^2}{\int_{\infty} d^3\vec{r}\,\epsilon(\vec{r})|\vec{E}(\vec{r})|^2} \approx -\frac{\Delta n}{n} = \gamma n_c, \tag{7}$$

where one can approximate $\Delta n \approx (\Delta\epsilon/2\epsilon)n$ and define $-\gamma$ as the constant of proportionality between $\Delta n/n$ and carrier density ($n_c = \#/V_{FC}$).

In silicon, Δn is primarily a result of coulomb interactions with the free carrier, while Burstein-Moss band-filling is negligible. Therefore, a simple Drude model analysis of this process estimates that the injection of carriers with a density $n_c$ shift the complex permittivity ε by $$\Delta\epsilon = \frac{q_e^2 n_c}{j\omega_s\epsilon_0}\left[\frac{\tau_e}{m_e^*(1+j\omega_s\tau_e)} + \frac{\tau_h}{m_h^*(1+j\omega_s\tau_h)}\right] \tag{8}$$

where $q_e$ is the electron charge, $\epsilon_0$ is the vacuum permittivity, $\omega_s$ is the signal beam's frequency, and τ and m* are the effective mass and mean collision time of the free charge carriers (electrons for "e" subscripts, and holes for "h" subscripts), respectively. The mean collision time governs the resulting behavior, and can be approximated using the experimentally measured mobilities $\mu_e \approx 1.5 \times 10^3$ cm$^2$ V$^{-1}$ s$^{-1}$, $\mu_h \approx 500$ cm$^2$ V$^{-1}$ s$^{-1}$ and effective masses m$^*_e$=0.26m$_e$, m$^*_h$=0.39m$_e$ of free carriers in undoped silicon at room temperature, which yields $\tau_e = \mu_e m^*_e/q_e \approx 0.22$ ps and $\tau_h = \mu_h m^*_h/q_e \approx 0.11$ ps. For a signal wavelength of $\lambda_s = 1.55$ µm, the high-frequency limit $\omega_s\tau \gg 1$ of Equation 9 for a weakly absorbing medium yields a frequency shift governed by $$\gamma = -\frac{\Delta n_{Si}}{n_{Si}} n_c = \frac{q_e^2}{2n_{Si}^2 \epsilon_0 \omega_S^2}\left[\frac{1}{m_e^*} + \frac{1}{m_h^*}\right] \quad (9)$$

and an additional free carrier absorption loss $$\Delta\alpha = \frac{2\pi}{\lambda_s}\frac{\epsilon_0 n_{Si}}{q_e^2 n_c}[\tau_e m_e^* + \tau_h m_h^*]\omega^3. \quad (10)$$

This corresponding loss can be represented with an additional absorptive quality factor $$Q_{abs} = \frac{\Delta\alpha\lambda}{4\pi n_{si}}. \quad (11)$$

$Q_{abs}$ can be estimated directly from experimental absorption data, or from the Drude model, where $Q_{abs}=\omega_s^3\tau n_{Si}/\omega_{plasma}^2$ for a cavity resonance at $\omega$ in a material with a plasma frequency $\omega_{plasma}=\sqrt{n_c q_e^2/m\epsilon_0}$—resulting from the presence of a carrier density $n_c$ of individual charges $q_e$ with mass m—and mean collision time $\tau$ as determined by the carrier mobility. This additional loss is negligible for the carrier densities required for switching, as $Q_{abs}$ is much larger than the desired loaded quality factors $Q_l$ (~$10^4$). One can neglect switching losses and consider the real component of the free carrier-induced index change.

Nonlinear Dynamics

While the free carrier dispersion effect's blueshift of cavity resonances enables all-optical tuning of the SLM, heating due to absorption and carrier recombination in most thermo-optic media causes an opposing redshift. The competition between these two nonlinearities is typically negligible for a single, short switching event, where the net recombination energy of carriers does not significantly change the temperature of the PhC membrane. However, repeated switching events can lead to long-term patterning effects due to the accumulation of thermal energy in the membrane.

Figure 4:
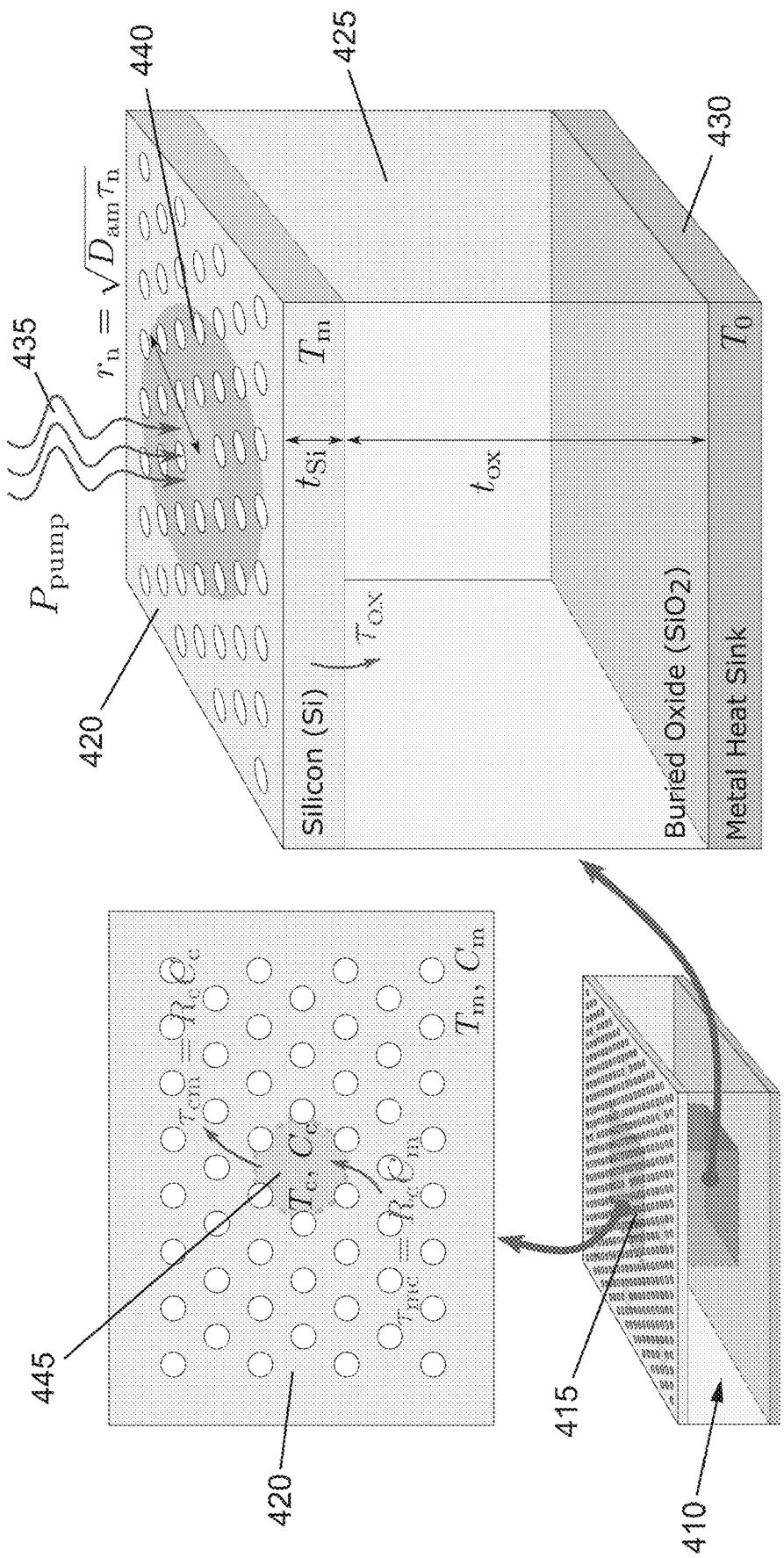
FIG. 4 shows a thermal model for the nonlinear resonator cavity array.

FIG. 4 shows a thermal model for the nonlinear resonator array. The composite device 410 is comprised of several (approximately) independent single-cavity unit cells 415. The device 410 generally includes a PhC cavity membrane 420, an oxide layer 425, and a metal heat sink 430. The PhC cavity in each cell 415 is patterned into the silicon membrane 420 of thickness $t_{Si}$ which lies above the buried oxide layer 425 of thickness $t_{ox}$ (reflecting a CMOS SOI geometry). Incident pump light 435 with power $P_{pump}$ is absorbed within the cavity 420, generating free carriers that are assumed to instantly diffuse to a uniform area $\pi r_n^2$, where $r_n$ is governed by the ambipolar diffusion coefficient $D_{am}$ and free carrier lifetime $\tau_n$. Carrier relaxation heats the cavity to a temperature $T_c$ as prescribed by its thermal capacitance $C_c$. Heat transfer to and from the membrane 415 (with a thermal capacitance $C_m$ at temperature $T_m$) as well as through the oxide layer 425 to the metal heat sink 430 (temperature $T_0$) occur at characteristic rates $\tau_{cm}$, $\tau_{mc}$, and $\tau_{ox}$, respectively. For the purposes of the model of FIG. 4, it is assumed that the control light is external and imaged onto the PhC cavity.

Since the all-optical SLM relies on repeated free carrier injection, a simple model based on the diagram in FIG. 4 is described here to explore the long-term feasibility of all-optical tuning. In this model, the PhC cavity array is decomposed into unit cells (e.g., the rectangular prism-like cell 415 in FIG. 4), each containing a single PhC cavity and assumed for simplicity to be independent of other unit cells. A periodic pump light pulse (e.g., the pump light 430 of FIG. 4) is projected onto the cavity, resulting in the generation of photoexcited carriers which we assume to instantaneously diffuse to an area $\pi r_n^2$ (shown as the larger circle 440 in FIG. 4), where $r_n$ is equal to the diffusion length for a given carrier lifetime. The resonant frequency of the cavity instantaneously shifts by an amount proportional to the resulting free carrier density, leading to a variation in the signal field emitted from the cavity. Excess energy from the absorption of above-bandgap pump light heats the PhC cavity. The corresponding increase in cavity temperature $T_c$ depends on the cavity's material, thickness, and area (circle 445 in FIG. 4), which is assumed to be bounded by the surrounding holes. Carrier recombination, as dictated by the free carrier lifetime $\tau_n$, also leads to heating within this cavity area 445. This thermal energy then diffuses (at a rate given by the material- and geometry-dependent thermal resistances; see arrows in FIG. 4.) to the surrounding membrane at temperature $T_m$ or through a buried oxide layer to a heat sink assumed to be at a constant temperature $T_0$.

The described behavior is captured by the following system of first order differential equations:

$$\frac{da_c(t)}{dt} = -j[\omega - \omega_0(t)]a_c(t) - \Gamma_{load}a_c(t) + j\sqrt{\frac{2}{\tau_c}}s_{in} \quad (12)$$

$$\frac{\Delta\omega_0(t)}{\Gamma} = -\frac{Q}{n_{eff}}\left[\frac{dn_{Si}}{\frac{dT_c}{\alpha_{TO}}}\Delta T_c(t) + \frac{dn_{Si}}{\frac{dn_c}{-\gamma n_{Si}}}n_c(t)\right] \quad (13)$$

$$\frac{dn_c(t)}{dt} = \underbrace{-\frac{n_c(t)}{\tau_n}}_{relaxation} + \underbrace{\left(1 - e^{-\alpha_{Si}(\omega)t_{Si}}\right)\frac{P_{pump}(t)}{\hbar\omega_{pump}V_{FC}}}_{pump\ absorption} \quad (14)$$

$$\frac{dT_c(t)}{dt} = -\frac{T_c(t) - T_0}{\tau_{ox}} - \frac{T_c(t) - T_m(t)}{\tau_{cm}} + \underbrace{C_c V_{FC} E_g \frac{n_c(t)}{\tau_n}}_{relaxation\ heating} + \underbrace{C_c \frac{\hbar\omega_{pump} - E_g}{\hbar\omega_{pump}}\left(1 - e^{-\alpha_{Si}(\omega)t_{Si}}\right)P_{pump}(t)}_{absorption\ heating} \quad (15)$$

$$\frac{dT_m(t)}{dt} = -\frac{T_m(t) - T_0}{\tau_{ox}} - \frac{T_m(t) - T_c(t)}{\tau_{mc}} \quad (16)$$

The definitions of the model parameters, as well as their associated values, and material properties of the silicon-on-insulator (SOI) architecture of interest are listed in the Table 1. Eqn. 12 describes the evolution of the cavity signal field $a_c$ (where $a_c$ is energy normalized such that $|a_c|^2$ is the total amount of confined energy) which decays at a rate $\Gamma_{load}$ and is driven by $s_{in}$ (power normalized; $|s_{in}|^2$=signal drive power). The carrier density evolution (Eqn. 14) is governed by the absorption of the pump power $P_{pump}$ and the carrier lifetime $\tau_n$. The cavity and membrane temperatures, as described by Eqns. 15 and 16, respectively, are coupled by conductive heat transfer according to the parameters in Table 1. For simplicity, photo-thermal oxidation, signal light effects (free carrier absorption, two-photon absorption, etc.), and other more complex long-term effects are neglected.

TABLE 1

| Parameter | Symbol | Value |
|---|---|---|
| Silicon Index | $n_{Si}$ | 3.48 |
| Silicon bandgap | $E_g$ | 1.11 eV |
| Silicon absorption coeff. | $\alpha_{Si}(\omega)$ | variable ($10^5$ m$^{-1}$ at 400 nm) |
| Silicon thermo-optic coeff. | $\alpha_{xo} = dn_{Si}/d\Gamma$ | $1.8 \times 10^{-4}$ K$^{-1}$ |
| Silicon density | $\rho_{Si}$ | 2.33 g/cm$^3$ |
| Oxide density | $\rho_{ox}$ | 2.65 g/cm$^3$ |
| Silicon heat capacity | $cv_{,Si}$ | 1 J/g · K |
| Oxide heat capacity | $cv_{,ox}$ | 0.7 J/g · K |
| Silicon thermal conductivity | $\kappa_{Si}$ | 100 W/m · K |
| Oxide thermal conductivity | $\kappa_{ox}$ | 1.3 W/m · K |
| PhC lattice constant | a | 410 nm |
| Silicon thickness | $t_{Si}$ | 220 nm |
| Oxide thickness | $t_{ox}$ | variable (~1 µm) |
| Cavity area | $A_c$ | bounded by holes around cavity perimeter |
| Membrane area | $A_m$ | (~2o × √3a for H1) variable (~10a × 10a) |
| Cavity volume | $V_c$ | $A_c t_{Si}$ |
| Membrane volume | $V_m$ | $A_m t_{Si}$ |
| Heat sink temp. | $T_0$ | variable (~293 K) |
| Cavity temp. | $T_c$ | variable |
| Membrane temp. | $T_m$ | variable |
| Cavity-membrane thermal resistance | $R_c$ | $10^4$ K/W |
| Cavity thermal capacitance | $C_c$ | $cv_{,Si}\rho_{Si}V_c$ |
| Membrane thermal capacitance | $C_m$ | $cv_{,Si}\rho_{Si}V_m$ |
| Cavity-to-membrane thermal diffusion time const. | $\tau_{cm}$ | $R_o C_c$ |
| Membrane-to-cavity thermal diffusion time const. | $\tau_{mc}$ | $R_c C_m$ |
| Oxide thermal diffusion time const. | $\tau_{ox}$ | $cv_{,ox}\rho_{ox}t_{ox}^2/\kappa_{ox}$ |
| Free carrier lifetime | $\tau_n$ | 1 ns |
| Ambipolar carrier diffusion coeff. | $D_{am}$ | 19 cm$^2$/s |
| Free carrier diffusion length | $\tau_n$ | $\sqrt{D_{am}\tau_n}$ |
| Free carrier density | $n_z$ | #/$\pi\tau_n^3 t_{Si}$ |
| Signal wavelength | $\lambda_s$ | 1550 nm. |
| Pump wavelength | $\lambda_p$ | 450 nm |
| Cavity field | $a_c(t)$ | variable |
| Cavity resonant frequency | $\omega_{Si}(t)$ | variable |
| Cavity quality factor | Q | $10^4$ |
| Cavity mode volume | $V_{eff}$ | 0.1 $(\lambda/n_{Si})^3$ |
| Pump period | T | variable (100 ns) |
| Pump duty cycle | η | variable (0.5) |
| Pump power | $P_{pump}(t)$ | square wave with peak $P_{ps}$, period T and duty η |

Figures 5A, 5B, 5C:
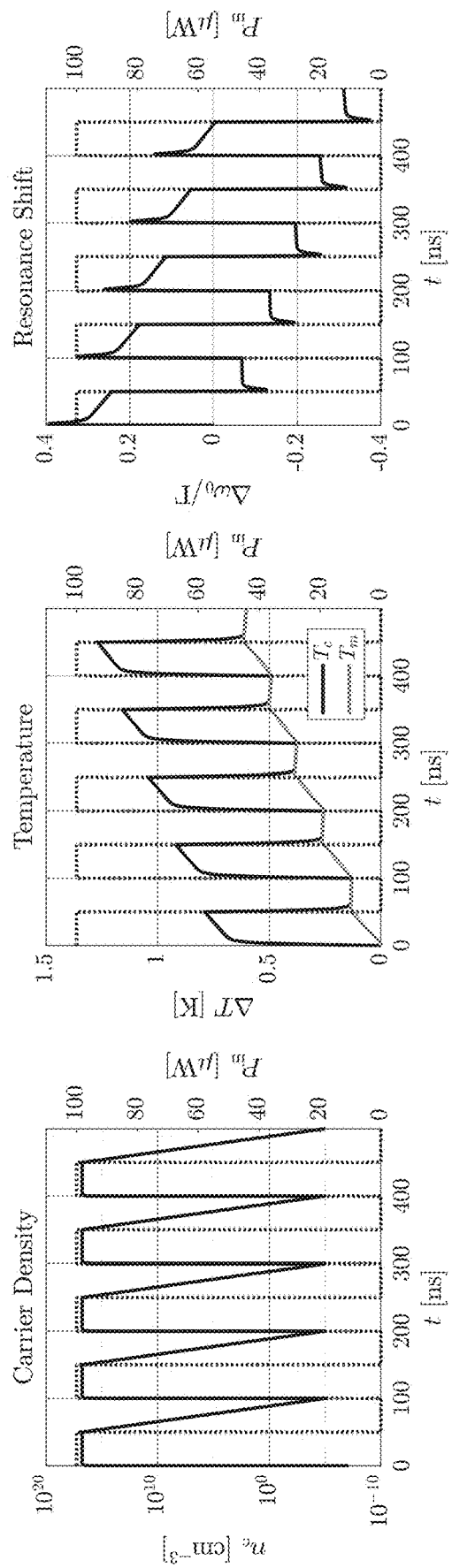
FIG. 5A shows a transient numerical solution of Eqns. 14-16 for the default parameters listed in Table 1 assuming a square wave pump input (dashed line), for carrier density.
FIG. 5B shows a transient numerical solution of Eqns. 14-16 for the default parameters listed in Table 1 assuming a square wave pump input (dashed line), for membrane temperature.
FIG. 5C shows a transient numerical solution of Eqns. 14-16 for the default parameters listed in Table 1 assuming a square wave pump input (dashed line), for resonance shift.

The following parameters in Table 1 are of particular interest:
- Oxide thickness $t_{ox}$: controls the characteristic timescale of conduction from the membrane to the underlying heat sink
- Membrane area $A_m$: determines the thermal capacity of the PhC slab within a unit cell (may be large enough to prevent cross talk between unit cells)
- Free carrier lifetime $\tau_n$: sets the maximum frame rate of the device
- Pump period T: length, relative to $\tau_n$, determines the carrier buildup over time
- Pump duty cycle η: sets the fraction of a period over which free carrier nonlinearities dominate thermal effects A portion of the transient numerical solution to Eqns. 14-16 for the default parameters listed in Table 1 is shown in FIGS. 5A-5C. A square wave pump excitation is assumed. Since T>>$\tau_n$, the carrier density (FIG. 5A) decays to ~0 during every cycle; however, the average membrane temperature (FIG. 5B) increases during each cycle. This accumulation occurs since the characteristic timescale of conduction through the buried oxide ($\tau_{ox}\approx2$ µs) is much longer than the pump period T. To prevent thermal accumulation when operating at modulation rates faster than $1/\tau_{ox}$~500 kHz, a thinner oxide layer ($\tau_{ox}\propto t_{ox}^2$) or supplemental heat sinking mechanism is used. The slab heating causes the resonance to gradually shift (FIG. 5C) until equilibrium is reached. Despite this slab heating, the distinct contributions of both free carrier and thermal index changes are present throughout the five shown modulation periods. The initial increase in $\omega_0$ due to free carriers gives way to an overall decrease as heating from carrier recombination becomes dominant, and the average resonance shift within a modulation period decreases as the membrane is heated.

Figures 6A, 6B, 6C:
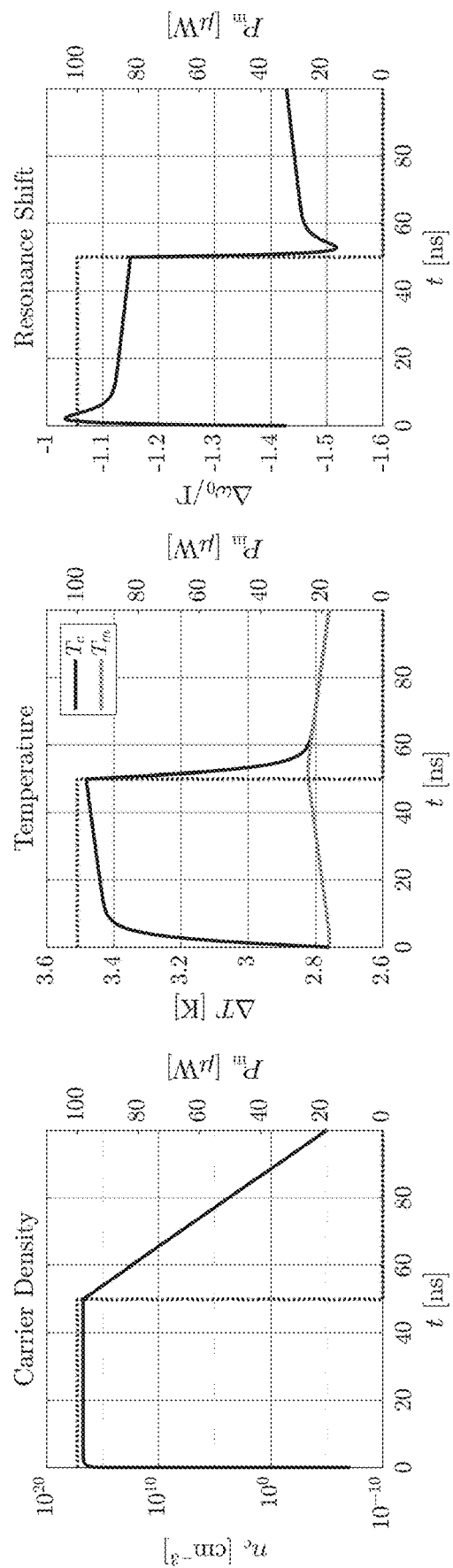
FIG. 6A shows a periodic steady state solution to Eqns. 14-16 for the default parameters of Table 1, for carrier density.
FIG. 6B shows a periodic steady state solution to Eqns. 14-16 for the default parameters of Table 1, for membrane temperature.
FIG. 6C shows a periodic steady state solution to Eqns. 14-16 for the default parameters of Table 1, for resonance shift.

FIGS. 6A-6C show a numerical shooting-method solution for the periodic steady state response. The carrier density is shown as a function of time in FIG. 6A. The temperature is shown as a function of time in FIG. 6B. The default parameters yield a negative steady state resonance shift (FIG. 6C) $\Delta\omega_0/\Gamma$ of approximately one linewidth due to the ~3K temperature increase of the membrane (see FIG. 6B); however, positive and negative deviations from this equilibrium are present due to free carrier and thermal effects. In a typical experimental setup, the signal laser would be biased about these values to achieve the desired switching.

FIGS. 7-10 show periodic steady state solutions for several variations of the "parameters of interest", and show, for each variation, carrier density (FIGS. 7A, 8A, 9A, 10A), membrane temperature (FIGS. 7B, 8B, 9B, 10B), and resonance shift (FIGS. 7C, 8C, 9C, 10C). FIG. 6B shows that, as expected, the mean temperature increase of the membrane is reduced by a factor of about 4 when the oxide thickness is halved to 0.5 µm. Further reduction of the temperature buildup may be possible by, as an example, by using thermally conductive vias connected directly between the PhC slab and underlying heat sink—since further thinning of the oxide layer would cause the underlying metal heat sink to interfere with the PhC cavity mode.

Figures 7A, 7B, 7C:
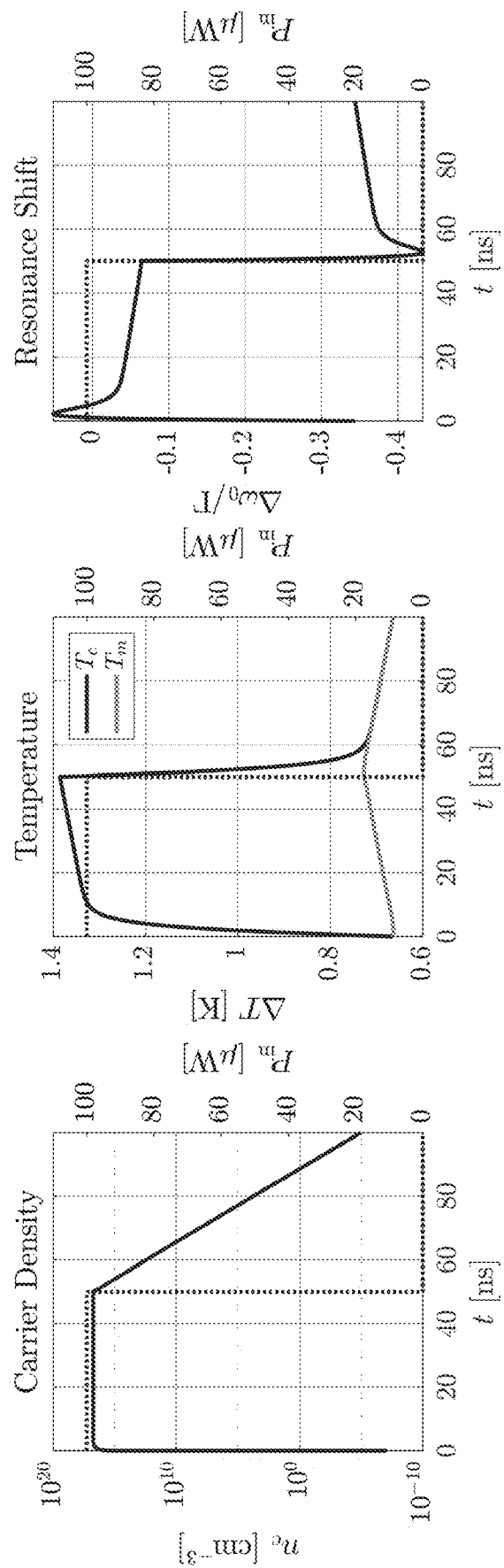
FIG. 7A shows the periodic steady state solution to Eqns. 14-16 when $t_{ox}$ is reduced to 0.5 μm to minimize membrane heating, for carrier density.
FIG. 7B shows the periodic steady state solution to Eqns. 14-16 when $t_{ox}$ is reduced to 0.5 μm to minimize membrane heating, for membrane temperature.
FIG. 7C shows the periodic steady state solution to Eqns. 14-16 when $t_{ox}$ is reduced to 0.5 μm to minimize membrane heating, for resonance shift.
Figures 8A, 8B, 8C:
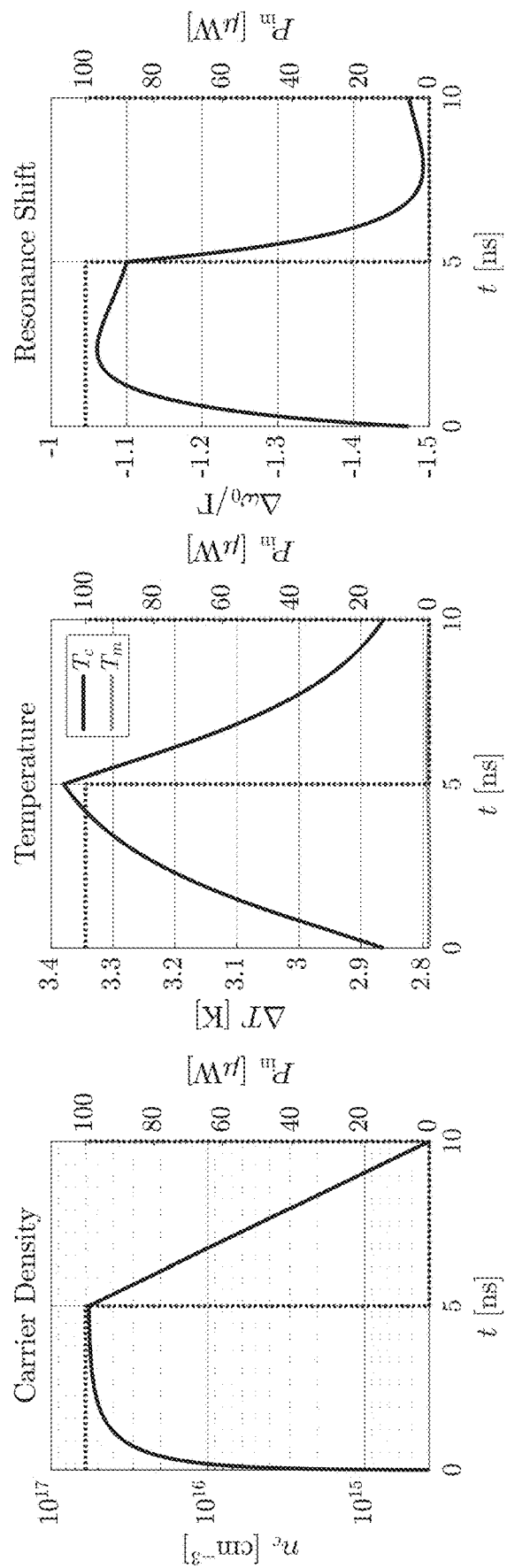
FIG. 8A shows the periodic steady state solution to Eqns. 14-16 for a shorter 10 ns pump period T, showing the possibility of fast switching when $T \sim \tau_n$, for carrier density.
FIG. 8B shows the periodic steady state solution to Eqns. 14-16 for a shorter 10 ns pump period T, showing the possibility of fast switching when $T \sim \tau_n$, for membrane temperature.
FIG. 8C shows the periodic steady state solution to Eqns. 14-16 for a shorter 10 ns pump period T, showing the possibility of fast switching when $T \sim \tau_n$, for resonance shift.
Figures 9A, 9B, 9C:
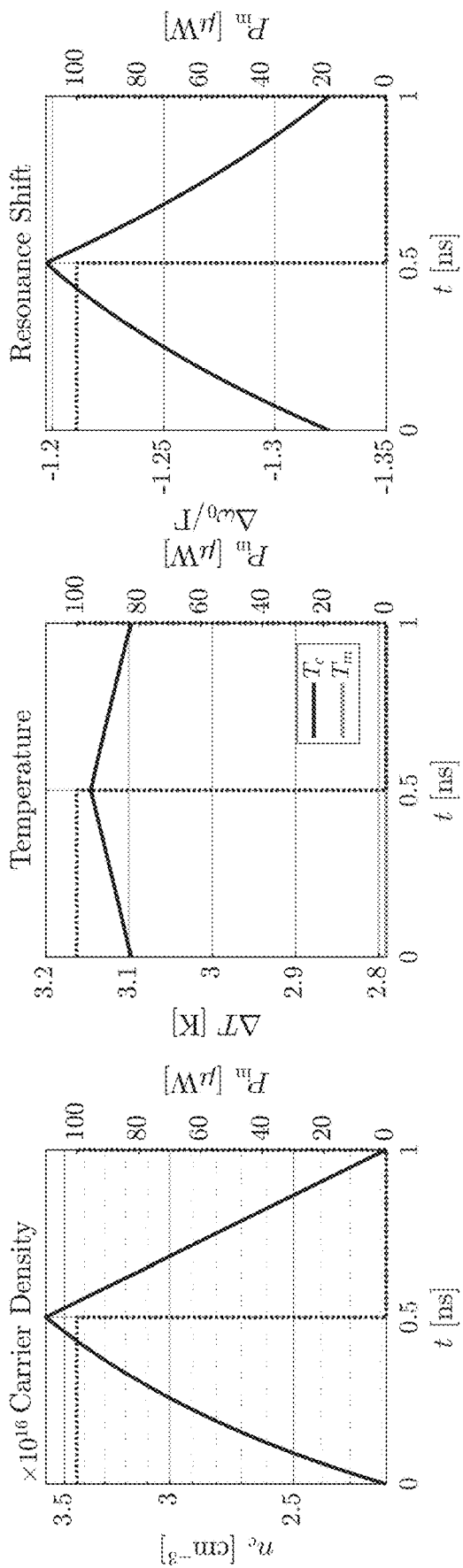
FIG. 9A shows the periodic steady state solution to Eqns. 14-16 for $T = \tau_n$, which limits switching contrast, for carrier density.
FIG. 9B shows the periodic steady state solution to Eqns. 14-16 for $T = \tau_n$, which limits switching contrast, for membrane temperature.
FIG. 9C shows the periodic steady state solution to Eqns. 14-16 for $T = \tau_n$, which limits switching contrast, for resonance shift.

As illustrated in FIG. 7C, the pump period can be decreased to T=10$\tau_n$ without significantly reducing the switching contrast. The switching contrast is substantially reduced when T=$\tau_n$ (FIG. 8), verifying that the switching rate is limited by the free carrier lifetime. Although a conservative value $\tau_n$=1 ns is assumed based on published recombination lifetimes in PhCs, the effective lifetime is typically much shorter –$\tau_n$~10 ps—possibly due to diffusion of carriers out of the optical mode, thus enabling switching rates of ~10 GHz.

Figures 11A, 11B, 11C:
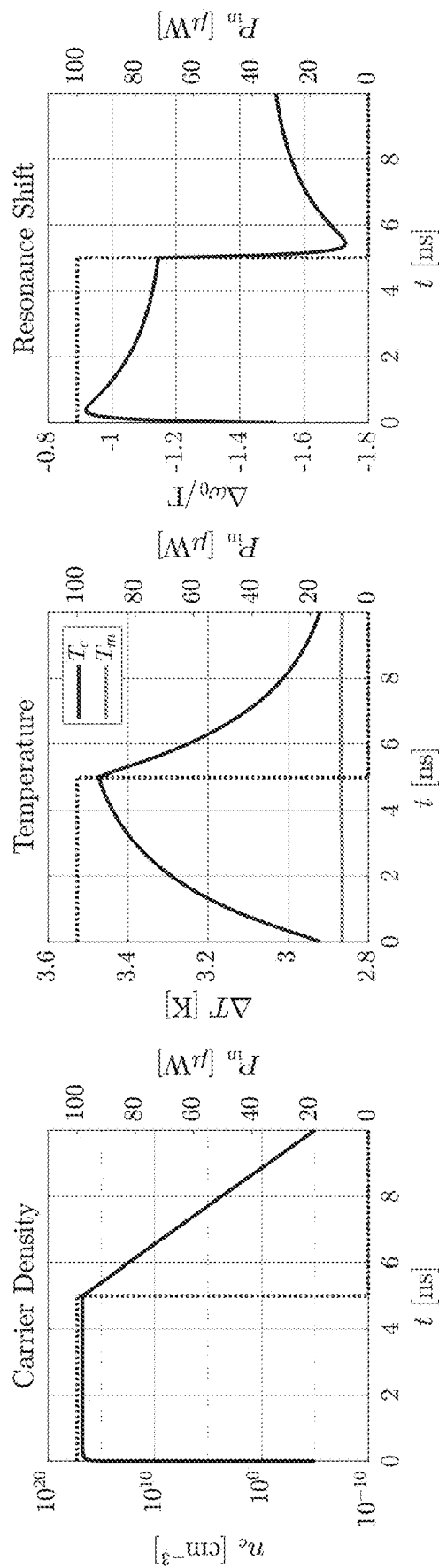
FIG. 11A shows the periodic steady state solution to Eqns. 14-16, with an enhanced switching contrast due to an enhanced carrier density when $\tau_n$ is reduced to 100 ps, for carrier density.
FIG. 11B shows the periodic steady state solution to Eqns. 14-16, with an enhanced switching contrast due to an enhanced carrier density when $\tau_n$ is reduced to 100 ps, for membrane temperature.
FIG. 11C shows the periodic steady state solution to Eqns. 14-16, with an enhanced switching contrast due to an enhanced carrier density when $\tau_n$ is reduced to 100 ps, for resonance shift.

Reducing the free carrier lifetime limits the timescales over which free carrier dispersion effects are dominant, as depicted in FIG. 11A for $\tau_n$=100 ps. However, reducing the carrier lifetime also reduces the diffusion length, which in turn increases the effective density of carrier in our model and amplifies the free carrier dispersion effect. An all-optical SLM can include a charge confinement technique to increase or maximize the carrier density within the nanocavity and a carrier lifetime control mechanism to reduce $\tau_n$ to the maximum permissible value for a given modulation rate. For instance, surrounding the cavity with an insulator (such as an oxide barrier) that prevents the charges from diffusing would increase the carrier density. Other ways to increase the carrier density can include designing the cavity such that absorption happens in a small region with a sub-bandgap semiconductor, with the rest of the cavity material having a larger bandgap.

Figures 10A, 10B, 10C:
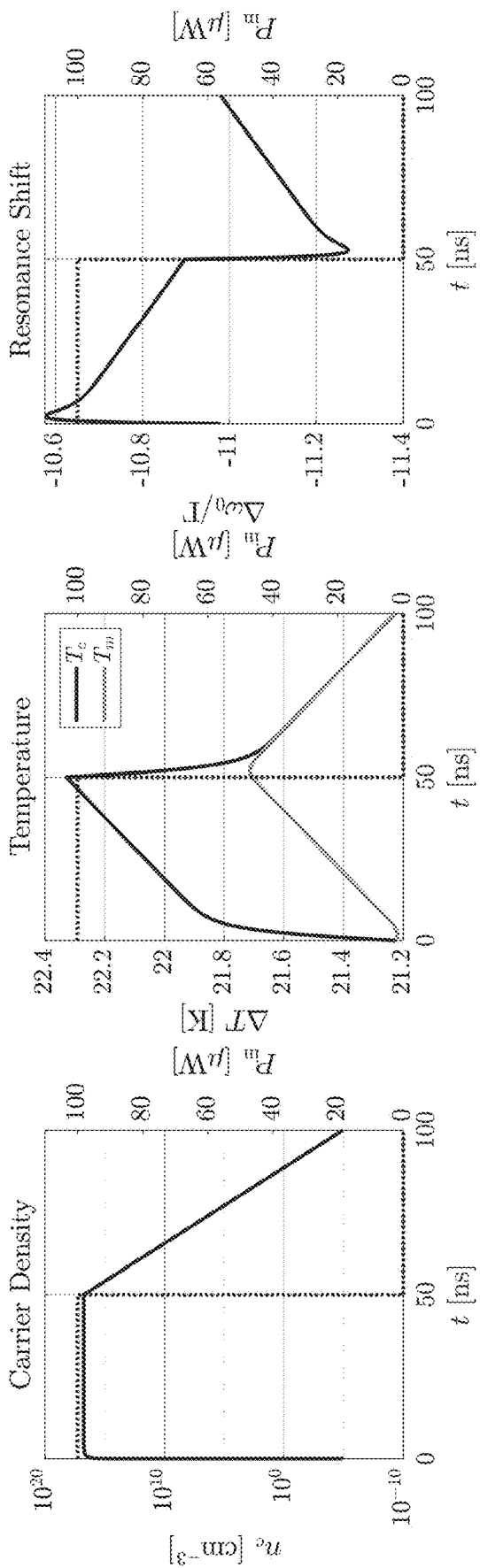
FIG. 10A shows the periodic steady state solution to Eqns. 14-16 for a smaller unit cell membrane ($A_m = 7a \times 7a$), which results in substantial temperature deviations but maintains switching contrast, for carrier density.
FIG. 10B shows the periodic steady state solution to Eqns. 14-16 for a smaller unit cell membrane ($A_m = 7a \times 7a$), which results in substantial temperature deviations but maintains switching contrast, for membrane temperature.
FIG. 10C shows the periodic steady state solution to Eqns. 14-16 for a smaller unit cell membrane ($A_m = 7a \times 7a$), which results in substantial temperature deviations but maintains switching contrast, for resonance shift.

FIGS. 10A-10C showcase two notable effects of reducing the membrane area (in this case to $A_m=7a\times 7a$): 1) increased steady state temperatures (see FIG. 10B) due to a reduced membrane thermal capacitance, and 2) an accelerated roll-off of free carrier index change (see FIG. 10A) due to the fast competing temperature rise of the reduced thermal mass.

Limitations

These examples lend insight into the dynamics of an experimental system. The experimental nonlinear switching response can be used to determine key coefficients governing the system behavior. The results can also make desirable the development of techniques to circumvent aspects such as potentially slow heat transfer between the PhC slab and underlying heat sink that can result in significant heating of the slab, especially for fast modulation rates. Another aspect to consider is that fast—as short as 3 ps—diffusion of carriers out of the nanocavity limits the impact of free carrier dispersion. Yet another aspect to consider is that excessively long carrier lifetimes of ~1 ns limit the achievable SLM frame rate to sub-GHz.

Each of these aspects can be addressed with the example enhancements described below.

Enhancements and Additional Techniques

PhC light sources: An external probe can be eliminated by using PhC light sources. Active PhC cavity emitters enable modulation rates in excess of 100 GHz due to Purcell effect enhancement of spontaneous emission rates, fJ/bit modulation energies, and tailored emission profiles.

Other semiconductor resonators: The use of PhC cavities, which afford high $Q/V_{eff}$ ratios, reduces the pump tuning power. However, the optically tuned architecture can work with any semiconductor resonator, including Fabry-Perot nano-post resonators, which offer lower quality factors but enhanced vertical coupling. In such bases, the cavity array is formed from subwavelength-diameter micropillars with distributed Bragg reflectors on either end.

Passivation: If desired, the free carrier lifetime can be extended by coating the PhC slab with an $Al_2O_3$ passivation layer, which reduces the surface recombination velocity.

p-i-n junction carrier control: Alternatively, shorter carrier lifetimes can be achieved by sweeping out carriers with an applied electric field. One approach is to integrate a reversed biased p-i-n junction, which has been used to reduce carrier lifetimes from 3 ns to 12 ps in silicon waveguides.

High performance claddings: Cladding PhC cavities increases thermal dissipation, reduces the impact of fabrication disorder, and increases structural durability. The cladding material can be chosen to hasten heat conduction out of the PhC slab, and the thickness can be reduced to the minimum feasible value with standard wafer thinning techniques.

Passive charge confinement: To enhance carrier density within a nanocavity and minimize cross-talk between resonators, each resonator can be enclosed by a subwavelength insulating (oxide or air, for example) wall. Carriers generated by a pump beam focused on a nanocavity therefore remain within the cavity boundary regardless of diffusion speed.

Photo-conductive materials: The array could be built with a photo-conductive semiconductor to enable actuation of short wavelength signal beams with longer wavelength pumps. Taking optical dipole trap array formation as an example, a slab made of material sensitive to shortwave infrared radiation could be used to switch a visible wavelength with 1.55 µm telecommunications light.

Other material systems: Any material with a non-negligible free carrier dispersion effect can be used for the PhC slab. Gallium nitride, for example, has a large 3.4 eV bandgap (for controlling visible wavelengths) while offering electro-refractive tuning performance comparable to silicon.

Pump absorption enhancement: Numerous techniques are capable of improving the pump absorption efficiency. For example, a reflector below the PhC slab would afford double-pass pump absorption and could enable interferometrically-enhanced absorption. Coupling pump light into a higher-order resonance of the PhC cavity could also improve pump absorption.

Electrical control: Electrical control of PhC cavities through integrated p-i-n junctions is generally possible; however, contacting individual elements would require the development of new bump bonding techniques, as the standard pitch is around 50 µm.

Heat dissipation: Thermally conductive vias can be placed to connect the PhC slab to an underlying heat sink. Even silicon, which is two orders of magnitude more thermally conductive than oxide, in a CMOS process could be used for this purpose. Another method (at the expense of increased optical loss) would be to coat the PhC slab in a thin, thermally conductive material—such as graphene or diamond—to remove heat from the slab. For example, the thermal conductivity of graphene-on-$SiO_2$ is 600 W/m·K (~500×that of oxide alone).

Coupled cavities: Sub-micron pitches between PhC cavities would be readily accessible if coupling between resonators can be tolerated. One approach would be to arrange the cavities such that the frequency resolved coupled modes generate the desired far-field emission patterns.

Example all-Optical SLM Designs

Example designs for an all-optical spatial light modulator can include those with the following photonic crystal layers: arrays of optimized L3 cavities with swept lattice hole radius in oxide-clad silicon, released silicon, and released silicon nitride; arrays of optimized L4/3 cavities with swept lattice hole radius in oxide-clad and released silicon; arrays of optimized H1 cavities with swept lattice hole radius oxide-clad silicon, released silicon, and released silicon nitride; and arrays of silicon, oxide-cladded, optimized H1 cavities with integrated gratings for vertical coupling.

Optimized Lattices

To solve for the lattice parameters, various slab geometries were simulated with the open-source MIT Photonic Bands (MPB) software. For each geometry and material system, a 2D sweep of normalized slab thickness $\bar{t}=t/a$ and hole radius $\bar{r}=r/a$ was conducted, yielding the bandgap width and normalized center frequency $\bar{\omega}_{center}$. A desired resonant wavelength $\lambda_s$ lies at the bandgap center when the condition $$\frac{\Delta a}{a} = \frac{t_{slab}}{\bar{t}} - \bar{\omega}_{center}\lambda_s = 0 \qquad (17)$$

is satisfied for a given, constant slab thickness $t_{slab}$ ($t_{slab}=220$ nm for silicon is assumed).

Figure 12A:
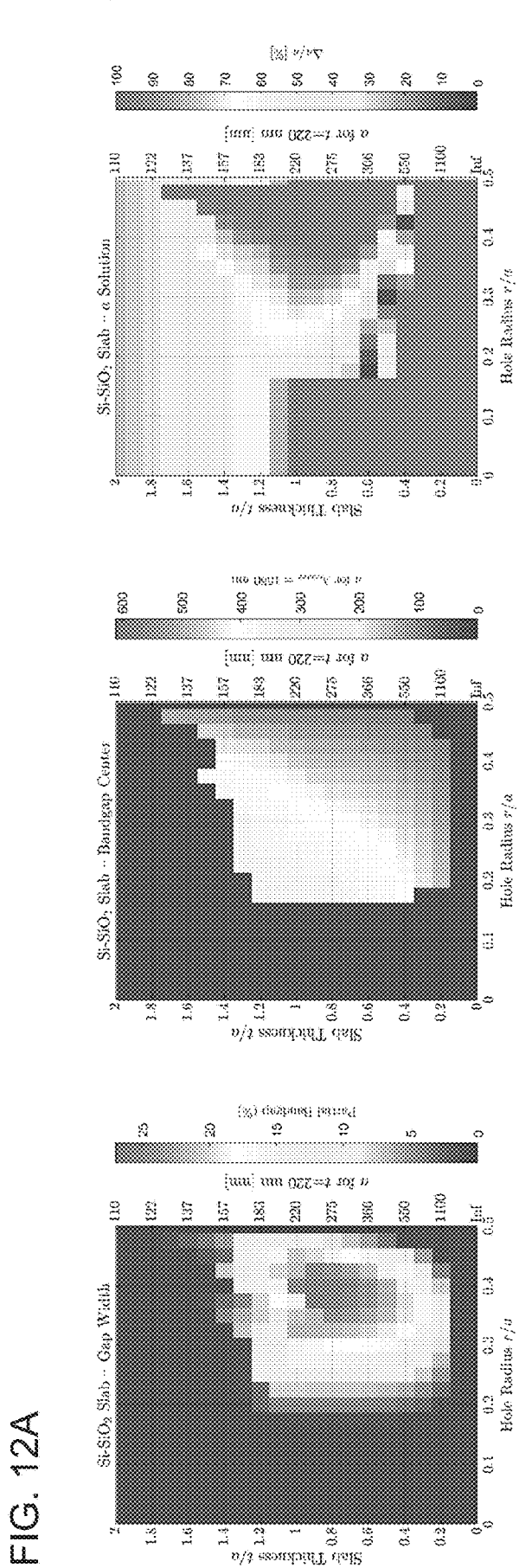
FIG. 12A shows bandgap width (left plot), center position (center plot), and design deviation (right plot) (Eqn. 17) for a 1.55 μm center wavelength for a lattice design for $t_{slab}$=220 nm-thick silicon slab with a surrounding oxide cladding.
Figure 12C:
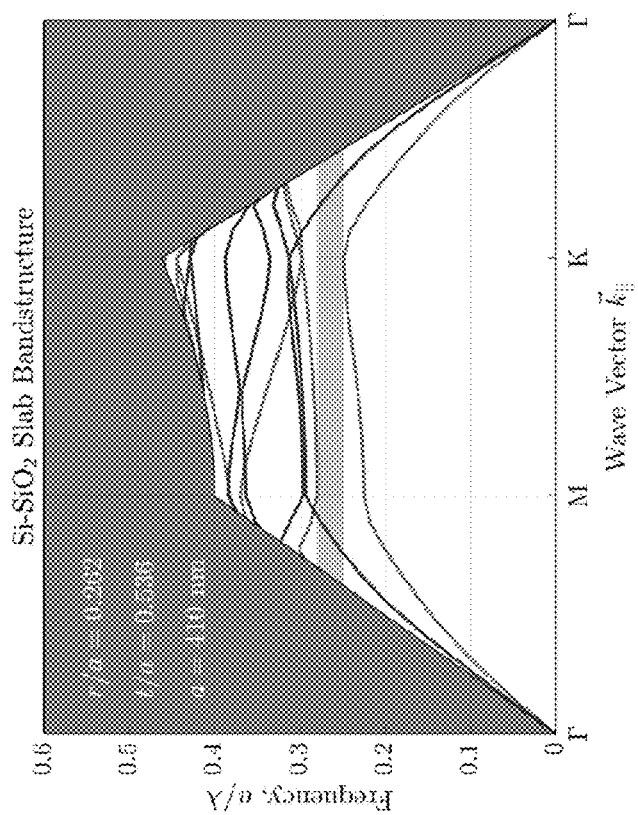
FIG. 12C shows the band structure of even and odd guided modes for r=0.379a and a=505 nm.
Figure 12B:
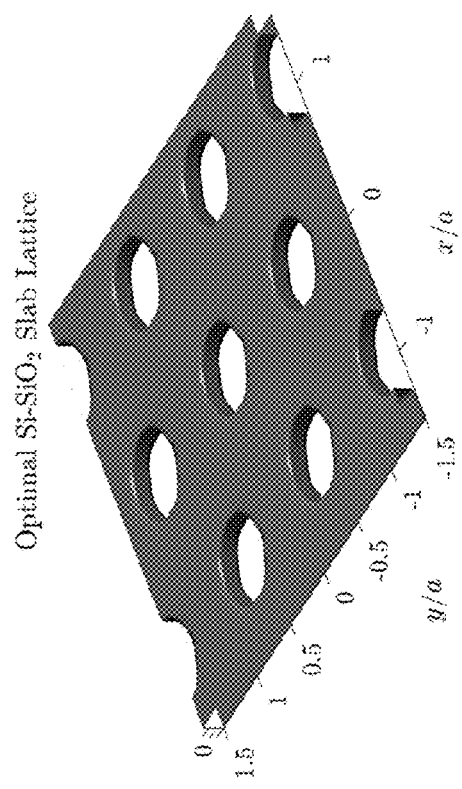
FIG. 12B shows a model of an example design lattice with r=0.262a and a=410 nm.
Figure 12E:
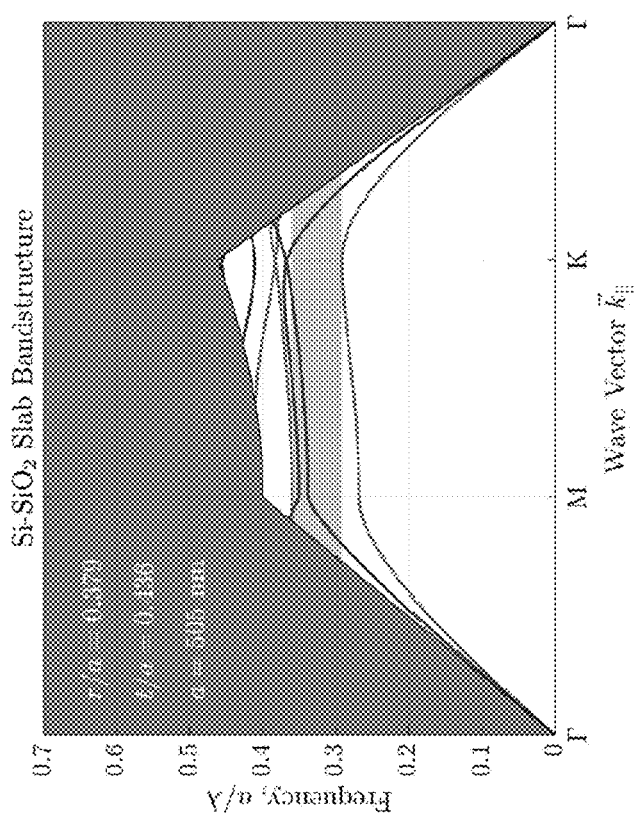
FIG. 12E shows the band structure of even and odd guided modes for r=0.379a and a=505 nm.
Figure 12D:
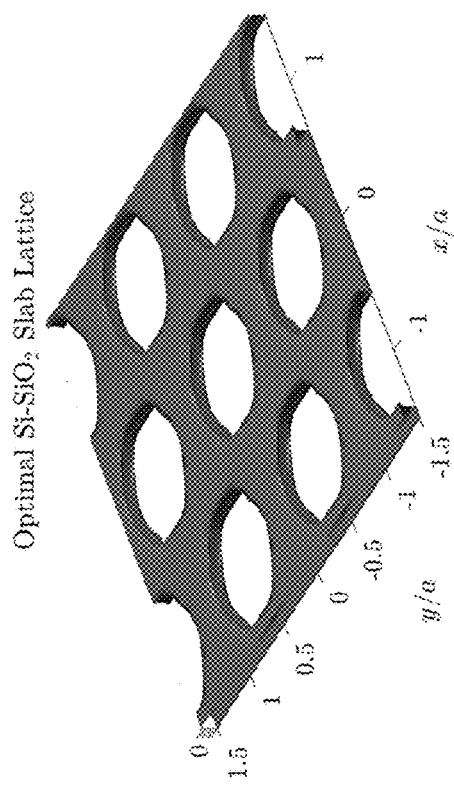
FIG. 12D shows a model of another example design lattice with r=0.379a and a=505 nm.

The simulations demonstrated that multiple designs satisfied this condition. The results of an oxide-cladded silicon slab, for example, are shown in FIGS. 12A-12E for a mid-gap wavelength $\lambda_s=1550$ nm. The results of (a) indicate that the partial bandgap (bandgap under the light cone) width is maximized for $\bar{t}\approx 0.9$ and $\bar{r}\approx 0.4$. The grid cells in the third subplot of FIG. 12A represent feasible designs, each associated with a different lattice period a shown in the corresponding location within the second subplot.

This range of possible solutions to Eqn. 17 is significant for manufacturing tolerances. Two optimal lattices and their associated band structures are shown in FIGS. 12B-E. The first solution (FIGS. 12B and 12C), r/a=0.262 and a=410 nm, is what is typically reported in literature. The alternative solution shown in FIGS. 12D and 12E—r/a=0.379 and a=505 nm—has a larger lattice constant, and therefore may be more amenable to photolithographic patterning.

Figure 13A:
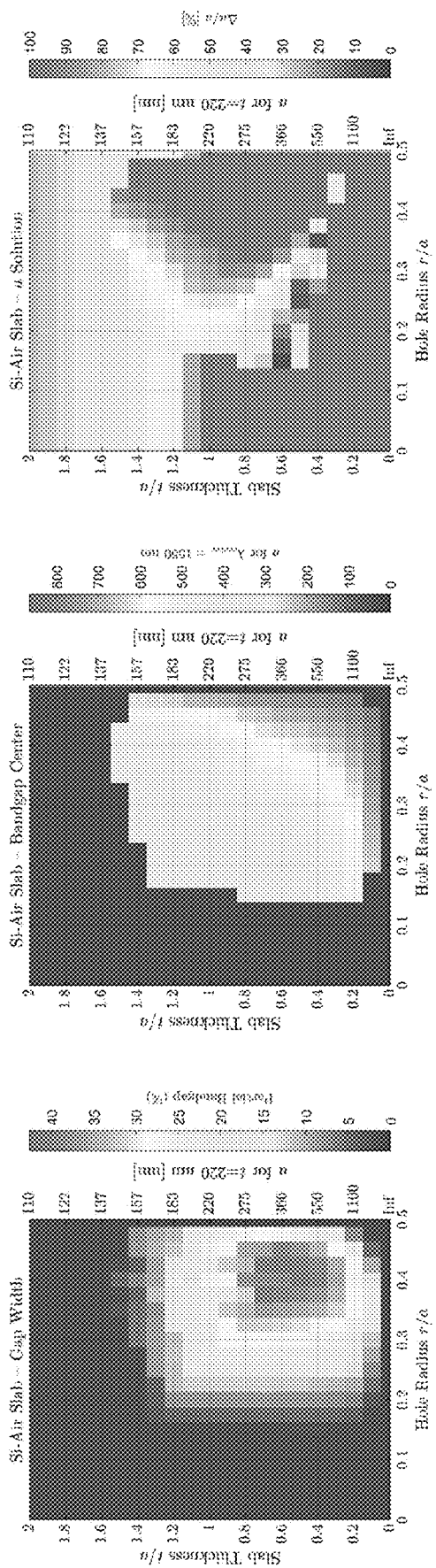
FIG. 13A shows bandgap width (left plot), center position (center plot), and design deviation (right plot) (Eqn. 17) for a 1.55 μm center wavelength for a lattice design for $t_{slab}$=220 nm-thick silicon slab with a surrounding air cladding.
Figure 13C:
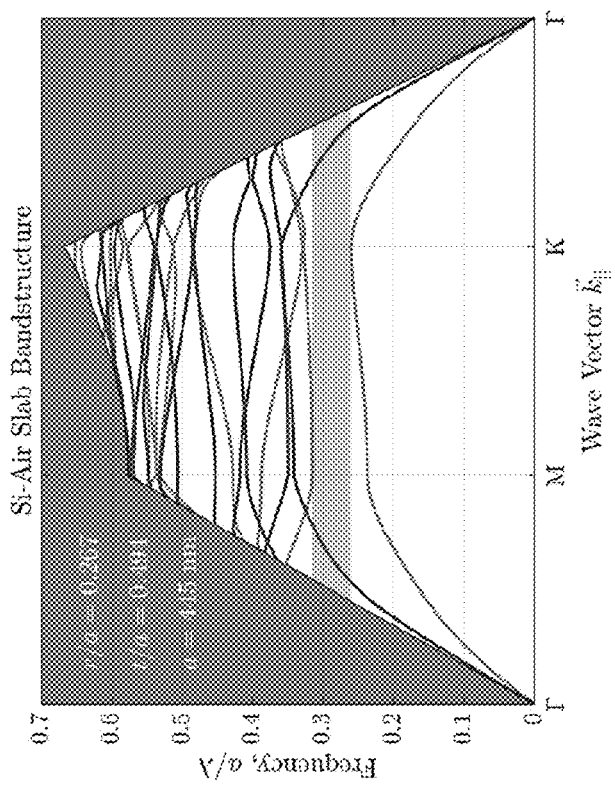
FIG. 13C shows the band structure of even and odd guided modes for r=0.267a and a=445 nm.
Figure 13B:
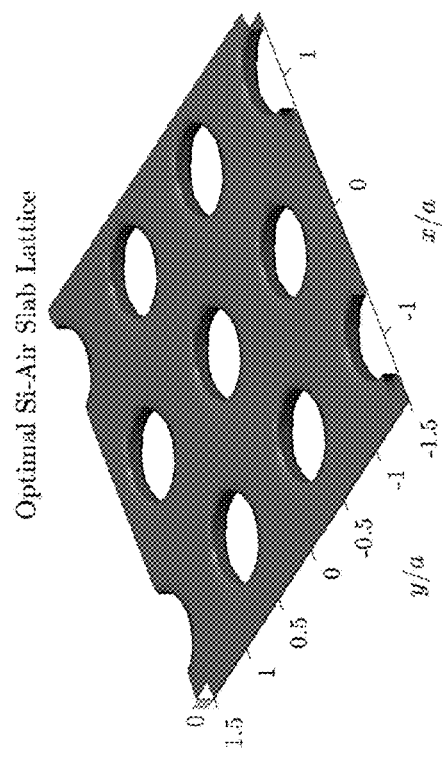
FIG. 13B shows a model of another example design lattice with r=0.267a and a=445 nm.

FIGS. 13A-13C illustrate the same results for released silicon. FIG. 13A shows the bandgap tradespace, FIG. 13B shows the mid-gap frequency, and FIG. 13C shows the design offset (Equation 17) for 1550 nm signal light. Partially due to the course sweep mesh used, at least one feasible design with a>400 nm was found for each slab. Future refinement of these simulations, combined with the experimental results of the fabrication run, may inform the design of an ideal, manufacturable PhC hole lattice for each desired material system.

Cavities

Figure 15:
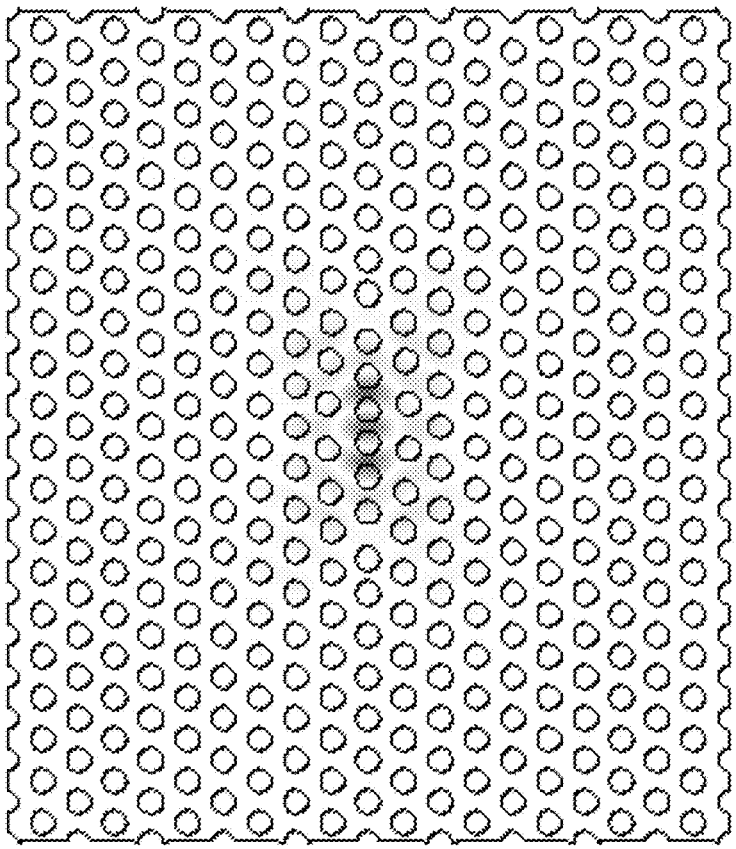
FIG. 15 shows the mode profile of an optimized oxide-clad silicon L4/3 PhC cavity produced via numerical optimization of quality factor in MEEP.
Figure 14:
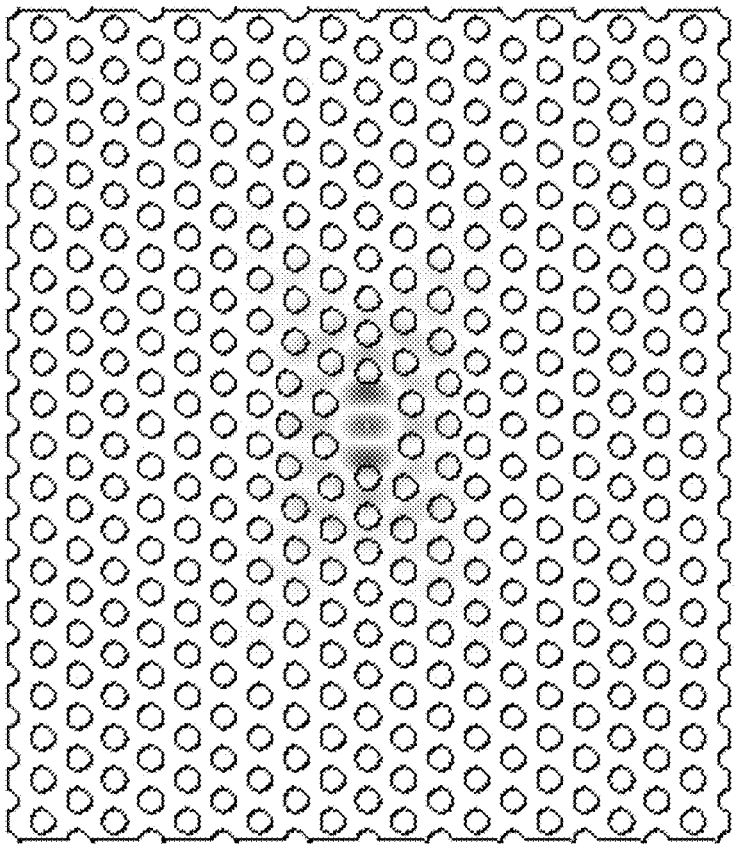
FIG. 14 shows the mode profile of an optimized oxide-clad silicon H1 PhC cavity produced via numerical optimization of quality factor in MEEP.

After selecting the hole lattice parameters, each cavity was designed using published, optimized hole shift values if possible, or optimized using 3D FDTD simulations in MEEP. The mode profiles of two resulting designs for oxide-cladded silicon slab PhC cavities are shown in FIGS. 14 and 15. FIG. 14 shows a H1 cavity formed by removing one hole from a hexagonal hole lattice in silicon. FIG. 15 shows a L4/3 cavity formed by replacing three holes with four holes in a hexagonal silicon lattice.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A spatial light modulator comprising:
    a two-dimensional array of semiconductor cavities disposed on a substrate, wherein:
        each semiconductor cavity in the two-dimensional array of semiconductor cavities comprises a photonic crystal cavity or a cavity region containing at least one semiconductor layer, a first distributed Bragg reflector (DBR) disposed at a first end of the cavity region, and a second DBR disposed at a second end of the cavity region to form a resonant cavity, and
        the two-dimensional array of semiconductor cavities scatters signal light at a resonant wavelength; and
    at least one incoherent light source, in optical communication with the two-dimensional array of semiconductor cavities, to tune the resonant wavelength of at least one semiconductor cavity in the two-dimensional array of semiconductor cavities by at least 20% of a linewidth of the at least one semiconductor cavity via optical free carrier injection so as to modulate amplitude and phase of signal light incident on the at least one semiconductor cavity.

2. The spatial light modulator of claim 1, wherein:
    each semiconductor cavity in the two-dimensional array of semiconductor cavities comprises a micropillar cavity,
    there is an adiabatic reduction in layer thicknesses of layers within the first DBR and within the second DBR toward a center of the resonant cavity,
    the at least one semiconductor layer includes a semiconductor absorptive layer disposed between the first DBR and the second DBR, and
    each semiconductor cavity in the two-dimensional array of semiconductor cavities has a quality factor Q of at least 1000.

3. The spatial light modulator of claim 1, wherein the two-dimensional array of semiconductor cavities comprises:
    H1 photonic crystal cavities; or
    L4/3 photonic crystal cavities.

4. The spatial light modulator of claim 1, wherein the two-dimensional array of semiconductor cavities has a pitch of about half the resonant wavelength to about the resonant wavelength.

5. The spatial light modulator of claim 1, wherein the at least one incoherent light source comprises a two-dimensional array of light-emitting diodes (LEDs).

6. The spatial light modulator of claim 1, wherein radiation emitted by the at least one incoherent light source is at a wavelength of less than 500 nm and the signal light is at a wavelength of more than 500 nm.

7. The spatial light modulator of claim 1, wherein a free carrier lifetime of semiconductor material within each semiconductor cavity in the two-dimensional array of semiconductor cavities is about 100 ps or less.

8. The spatial light modulator of claim 1, wherein a free carrier lifetime of semiconductor material within each semiconductor cavity in the two-dimensional array of semiconductor cavities is about 1 ns or more.

9. The spatial light modulator of claim 1, further comprising:
    a signal light source, in optical communication with the two-dimensional array of semiconductor cavities, to illuminate the two-dimensional array of semiconductor cavities with the signal light.

10. The spatial light modulator of claim 9, wherein the spatial light modulator does not include a waveguide between the signal light source and the two-dimensional array of semiconductor cavities.

11. The spatial light modulator of claim 9, further comprising:
    a control layer, operably coupled to the at least one incoherent light source, to modulate the at least one incoherent light source at a rate of at least 1 GHz.

12. The spatial light modulator of claim 9, wherein the signal light source is positioned for normal incidence of the signal light on the two-dimensional array of semiconductor cavities.

13. The spatial light modulator of claim 12, further comprising:
    a polarizing beam splitter, in optical communication with the two-dimensional array of semiconductor cavities, to receive the signal light reflected by the two-dimensional array of semiconductor cavities and to separate the signal light into directly reflected light and cavity reflected light.

14. The spatial light modulator of claim 9, wherein the signal light source is positioned for off-normal incidence of the signal light on the two-dimensional array of semiconductor cavities.

15. The spatial light modulator of claim 14, wherein the signal light reflected from the two-dimensional array of semiconductor cavities includes directly reflected light and cavity reflected light.

16. The spatial light modulator of claim 9, further comprising:
    a sensing device to detect the signal light reflected from the two-dimensional array of semiconductor cavities.

17. A spatial light modulator, comprising:
    a resonant surface to reflect incident signal light at a resonant wavelength; and
    at least one incoherent light source, in optical communication with the resonant surface, to tune the resonant wavelength of at least one oscillator of the resonant surface by at least 20% of a linewidth of the at least one oscillator via optical free carrier injection and to modulate amplitude and phase of signal light incident on the at least one oscillator, wherein the at least one oscillator comprises a photonic crystal cavity or a cavity region containing at least one semiconductor layer, a first distributed Bragg reflector (DBR) disposed at a first end of the cavity region, and a second DBR disposed at a second end of the cavity region to form a resonant cavity.

18. The spatial light modulator of claim 17, further comprising:
    a signal light source, in optical communication with the resonant surface, to produce the incident signal light that is reflected off the resonant surface generating reflected signal light.

19. The spatial light modulator of claim 18, further comprising:
    a sensing device to detect the reflected signal light.

20. The spatial light modulator of claim 17, wherein:
the at least one oscillator comprises a micropillar cavity,
there is an adiabatic reduction in layer thicknesses of layers within the first DBR and the second DBR toward a center of the resonant cavity,
the at least one semiconductor layer includes a semiconductor absorptive layer disposed between the first DBR and the second DBR.

21. The spatial light modulator of claim 17, wherein the resonant surface includes a wavelength-scale patterned semiconductor slab.

22. The spatial light modulator of claim 21, wherein the resonant surface supports a spatially distributed resonant mode.

23. A spatial light modulator, comprising:
a two-dimensional array of semiconductor cavities disposed on a substrate, wherein:
the two-dimensional array of semiconductor cavities scatters signal light at a resonant wavelength, and
each semiconductor cavity in the two-dimensional array of semiconductor cavities has a quality factor Q of at least 1000 and has a transverse pixel size from of about half a resonant wavelength of the signal light to about the resonant wavelength of the signal light; and
at least one incoherent light source, in optical communication with the two-dimensional array of semiconductor cavities, to tune the resonant wavelength of at least one semiconductor cavity in the two-dimensional array of semiconductor cavities by at least 20% of a linewidth of the at least one semiconductor cavity via optical free carrier injection so as to modulate amplitude and phase of signal light incident on the at least one semiconductor cavity.

* * * * *